United States Patent
Fujitsu

(10) Patent No.: US 11,237,260 B2
(45) Date of Patent: Feb. 1, 2022

(54) PROCESSING APPARATUS FOR ESTIMATING A MOVEMENT DIRECTION OF A TARGET

(71) Applicant: DENSO TEN Limited, Kobe (JP)

(72) Inventor: Seiya Fujitsu, Kobe (JP)

(73) Assignee: DENSO TEN Limited, Kobe (JP)

( * ) Notice: Subject to any disclaimer, the term of this patent is extended or adjusted under 35 U.S.C. 154(b) by 332 days.

(21) Appl. No.: 16/437,044

(22) Filed: Jun. 11, 2019

(65) Prior Publication Data

US 2019/0383931 A1    Dec. 19, 2019

(30) Foreign Application Priority Data

Jun. 13, 2018 (JP) ............................. JP2018-113047
Jul. 30, 2018 (JP) ............................. JP2018-142875

(51) Int. Cl.
    *G01S 13/62* (2006.01)
(52) U.S. Cl.
    CPC .................................. *G01S 13/62* (2013.01)
(58) Field of Classification Search
    CPC ....................................................... G01S 13/62
    See application file for complete search history.

(56) References Cited

U.S. PATENT DOCUMENTS

| 2017/0254882 A1* | 9/2017 | Malik ................... G01S 7/415 |
| 2018/0367871 A1* | 12/2018 | Zeng ...................... G01S 17/89 |
| 2018/0374235 A1* | 12/2018 | Kamata ............. G06K 9/00214 |
| 2021/0003687 A1* | 1/2021 | Nishida ................. G01S 13/42 |

FOREIGN PATENT DOCUMENTS

| JP | 2000-193745 A | 7/2000 |
| JP | 2007-248056 A | 9/2007 |
| JP | 2012-103203 A | 5/2012 |

* cited by examiner

*Primary Examiner* — Donald H B Braswell
(74) *Attorney, Agent, or Firm* — Oliff PLC

(57) ABSTRACT

A processing apparatus for a target detection apparatus includes a processor and associated memory. The processor and associated memory are configured to: generate, for a plurality of reflection points at which transmitted radio waves are reflected by a target, a plurality of instantaneous data sets, each of which includes a projected relative velocity of a said reflection point with respect to a host vehicle; calculate, for each of the plurality of instantaneous data sets, a projected ground velocity of the reflection point with respect to the host vehicle based on the projected relative velocity and a velocity of the host vehicle; align starting points of the calculated projected ground velocities to a predetermined point; and estimate a movement direction of the target from an intersection of perpendicular lines to the projected ground velocities whose starting points are aligned.

16 Claims, 26 Drawing Sheets

| ID | ABSOLUTE VALUE OF PROJECTED RELATIVE VELOCITY | ABSOLUTE VALUE OF PROJECTED GROUND VELOCITY | ANGLE | STORAGE LAPSE COUNT |
|---|---|---|---|---|
| 1 | #A1 | #B1 | 30 | 2 |
| ⋮ | ⋮ | ⋮ | ⋮ | ⋮ |
| 11 | #A11 | #B11 | 35 | 1 |
| ⋮ | ⋮ | ⋮ | ⋮ | ⋮ |
| 21 | #A21 | #B21 | 32 | 0 |
| ⋮ | ⋮ | ⋮ | ⋮ | ⋮ |

ROTATION ANGLE OF HOST VEHICLE IS "−3" DEGREES

| ID | ABSOLUTE VALUE OF PROJECTED RELATIVE VELOCITY | ABSOLUTE VALUE OF PROJECTED GROUND VELOCITY | ANGLE | STORAGE LAPSE COUNT |
|---|---|---|---|---|
| 1 | #A1 | #B1 | 30→33 | 2→3 |
| ⋮ | ⋮ | ⋮ | ⋮ | ⋮ |
| 11 | #A11 | #B11 | 35→38 | 1→2 |
| ⋮ | ⋮ | ⋮ | ⋮ | ⋮ |
| 21 | #A21 | #B21 | 32→35 | 0→1 |
| ⋮ | ⋮ | ⋮ | ⋮ | ⋮ |

DELETE DATA IN WHICH COUNT IS EQUAL TO OR MORE THAN PREDETERMINED NUMBER (3)

FIG. 7

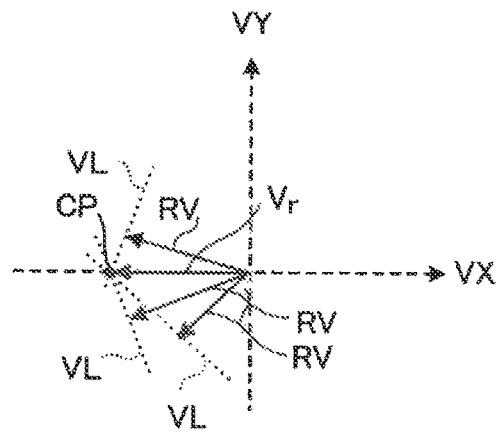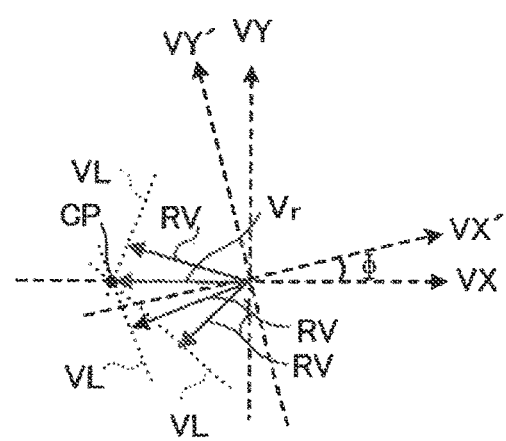
FIG. 14B

PROCESSING APPARATUS FOR ESTIMATING A MOVEMENT DIRECTION OF A TARGET

BACKGROUND OF THE INVENTION

Field of the Invention

The invention relates to a processing apparatus that is mounted on a target detection apparatus and an axis deviation detection method.

Description of the Background Art

Conventionally, for example, a target detection apparatus that transmits radio waves around a vehicle and detects instantaneous data including a "relative velocity" of a target with respect to a host vehicle, and the like, based on reflection waves of the transmitted radio waves reflected by the target has been known (for example, Japanese published unexamined application No. 2000-193745). Furthermore, there has been known a target detection apparatus that detects an axis deviation of the target detection apparatus that is installed in a predetermined direction (for example, Japanese published unexamined application No. 2007-248056).

However, in the above target detection apparatus, in order to obtain an actual movement direction and a speed of the target, it is necessary to evaluate a temporal continuity between several scans of the instantaneous data from an initial detection. Therefore, in the conventional target detection apparatus, since the actual movement direction of the target is found after several scans, there has been a problem that responsiveness to the target is not increased. Similarly, since the responsiveness to the target is not increased, the axis deviation of the target detection apparatus is not rapidly detected.

SUMMARY OF THE INVENTION

According to one aspect of the invention, a processing apparatus for a target detection apparatus includes a processor and associated memory. The processor and associated memory are configured to: generate, for a plurality of reflection points at which transmitted radio waves are reflected by a target, a plurality of instantaneous data sets, each of which includes a projected relative velocity of a said reflection point with respect to a host vehicle; calculate, for each of the plurality of instantaneous data sets, a projected ground velocity of the reflection point with respect to the host vehicle based on the projected relative velocity and a velocity of the host vehicle; align starting points of the calculated projected ground velocities to a predetermined point; and estimate a movement direction of the target from an intersection of perpendicular lines to the projected ground velocities whose starting points are aligned.

As a result, it is possible to improve responsiveness to the target.

According to another aspect of the invention, a processing apparatus mounted on a target detection apparatus installed in a predetermined direction includes a processor and associated memory. The processor and associated memory are configured to: generate, for each of a plurality of reflection points at which transmitted radio waves are reflected by a target, a plurality of instantaneous data sets, each of which includes a projected relative velocity of a said reflection point with respect to a host vehicle; align starting points of the projected relative velocities to a predetermined point; estimate a movement direction of the host vehicle from an intersection of perpendicular lines to the projected relative velocities whose starting points are aligned; and detect an axis deviation from the predetermined direction based on the estimated movement direction of the host vehicle.

As a result, it is possible to detect the axis deviation rapidly.

These and other objects, features, aspects and advantages of the invention will become more apparent from the following detailed description of the invention when taken in conjunction with the accompanying drawings.

BRIEF DESCRIPTION OF THE DRAWINGS

FIG. 7 illustrates an updating process by a buffer updating part;

FIG. 14B illustrates an outline of an axis deviation detection method;

DESCRIPTION OF THE EMBODIMENTS

First Embodiment

An embodiment of a processing apparatus disclosed in the application will be hereinafter described in detail with reference to accompanying drawings. The invention is not limited to the embodiment described below. Hereinafter, a description will be made by taking a case in which a target detection apparatus mounting the processing apparatus is an FM-CW (Frequency Modulated Continuous Wave) radar apparatus, as an example, but other radar apparatus, such as an FCM (Fast-Chirp Modulation) radar apparatus, may be used.

Before moving to the detailed description of the invention, the term "velocity" used in the description will be defined as follows. In the description of the present application, the term "velocity" is used as vector quantity as widely been accepted. And, two velocities, a ground velocity and a relative velocity, each having a different reference, are used.

The ground velocity is a velocity with respect to a stationary object, such as ground. The ground velocity may be regarded as a "velocity of a vehicle" displayed on a speedometer, or the like.

The relative velocity is a velocity of a target with respect to a host vehicle. In other words, the relative velocity is the velocity of the target when the host vehicle is assumed to be at rest. For example, a ground velocity of the host vehicle is referred to as v1 and a ground velocity of another vehicle is referred to as v2. In this case, a relative velocity of another vehicle is v2-v1 Obtained by subtracting the ground velocity v1 of the host vehicle as a reference from the ground velocity v2 of another vehicle.

Furthermore, a "velocity of B with respect to A" means the velocity of B projected on a direction vector "from B to A". For example, a "relative velocity of another vehicle with respect to the host vehicle" means the relative velocity of another vehicle projected on the direction vector from another vehicle to the host vehicle. The same applies to the ground velocity.

Figure 1A:
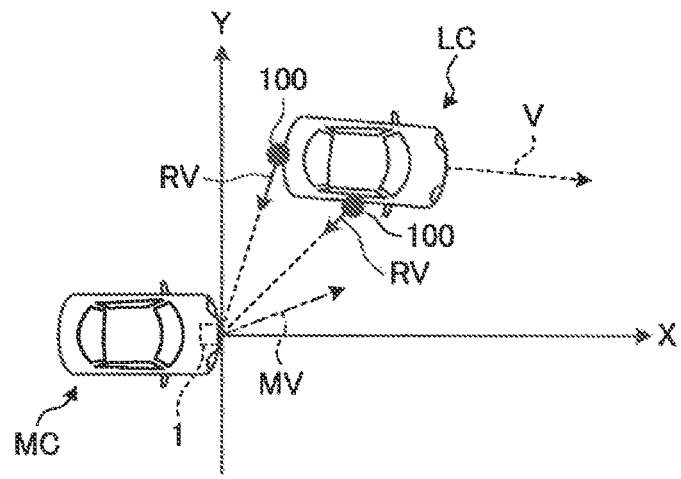
FIG. 1A illustrates an outline of a target detection method according to an embodiment.
Figure 1B:
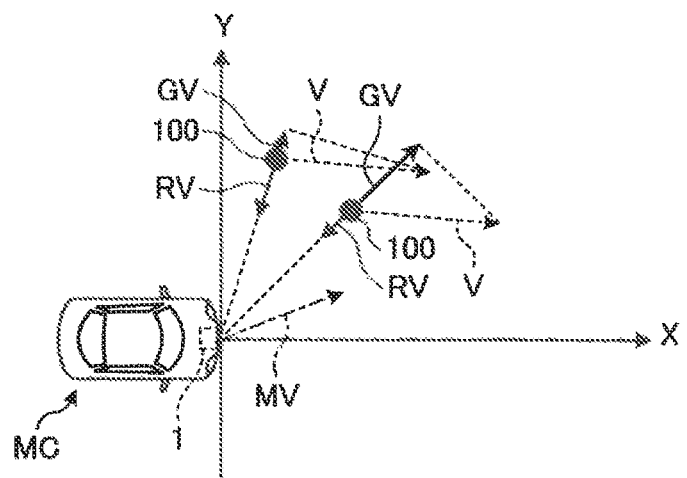
FIG. 1B illustrates the outline of the target detection method according to the embodiment.
Figure 1C:
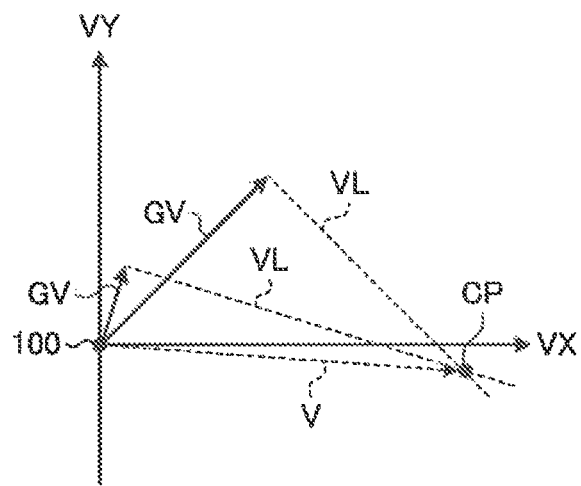
FIG. 1C illustrates the outline of the target detection method according to the embodiment.

First, an outline of the processing apparatus according to the embodiment will be described with reference to FIG. 1A to FIG. 1C. FIG. 1A to FIG. 1C illustrate the outline of the processing apparatus according to the embodiment. FIG. 1A shows a host vehicle MC mounting a target detection apparatus 1, and another vehicle LC that moves. The target detection apparatus 1 includes the processing apparatus according to the embodiment. It is assumed that the host vehicle MC moves at a ground velocity MV (hereinafter, referred to as a "self-motion vector MV"). It is assumed that another vehicle LC moves at a ground velocity V (hereinafter, referred to as a "motion vector V").

As illustrated in FIG. 1A, the target detection apparatus 1 is mounted on the host vehicle MC. The target detection apparatus 1 detects a target (e.g., another vehicle LC, and the like) that exists in a traveling direction of the host vehicle MC. The target detection apparatus 1 is mounted, for example, in front and rear grilles, on a windshield and left and right side parts (e.g., left and right side mirrors), and the like, of the host vehicle MC.

When detecting the target, the target detection apparatus 1 transmits radio waves around the host vehicle MC. The target detection apparatus 1 receives the transmitted radio waves and detects a plurality of reflection points at which the radio waves are reflected. The reflection points are, for example, on a surface of another vehicle LC and a surface of a guardrail. The target detection apparatus 1 generates a set of instantaneous data 100 (hereinafter, referred to as an "instantaneous data set 100") for each of the reflection points. The instantaneous data set 100 includes information about the reflection points. The instantaneous data set 100 includes, for example, positions of the reflection points, and the relative velocities (hereinafter, referred to as a "projected relative velocity RV") of the reflection points with respect to the target detection apparatus 1.

Here, a conventional target detection apparatus will be described. The conventional target detection apparatus can obtain the "relative velocities" of the reflection points with respect to the target detection apparatus 1 with one time scan. Because the conventional target detection apparatus typically uses Doppler effect to obtain velocities of the reflection points, the obtained "relative velocities" become the vector projection of the "actual" relative velocities of the reflection points onto the direction from the target to the host vehicle (e.g., the projected relative velocities RV illustrated in FIG. 1A). Therefore, the relative velocity and the ground velocity that represent an actual movement direction and the velocity of the target cannot be obtained with one time scan, and the actual movement direction of the target should be obtained from changes in several scan data. In other words, in the conventional target detection apparatus, since several scans are required to find the actual movement direction of the target, there has been a problem that responsiveness to a target movement is not increased.

The target detection apparatus 1 including the processing apparatus according to the embodiment can detect the actual movement direction of the target with one scan. The specific description will be made by using FIG. 1B and FIG. 1C. FIG. 1B illustrate calculation of a projected ground velocity GV. The processing apparatus according to the embodiment generates a plurality of the instantaneous data sets 100 including the projected relative velocity RV based on a received signal received by the target detection apparatus 1. The processing apparatus excludes a ground velocity component of the host vehicle MC from the projected relative velocity RV to calculate the projected ground velocity GV that indicates the ground velocity of the reflection points with respect to the host vehicle MC. Such a point will be described later in FIG. 8.

FIG. 1C illustrates a calculation of the Motion vector V. The processing apparatus according to the embodiment aligns starting points of the projected ground velocities GV respectively corresponding to the plurality of the instantaneous data sets 100 to a predetermined point (the predetennined point means an origin in an example shown in FIG. 1C). The processing apparatus extends a perpendicular line VL from an end point of each of the projected ground velocities GV to calculate an intersection CP of the perpendicular lines VL. The processing apparatus estimates the motion vector V of another vehicle LC as the target from a vector connecting an origin and the intersection CP.

FIG. 1C illustrates a two dimensional plane as an example in which the starting points of the projected ground velocities GV respectively corresponding to two instantaneous data sets 100 are aligned. In FIG. 1C, a vertical axis shows a ground velocity component (VY) in a left and right direction of the host vehicle MC, and a horizontal axis indicates a ground velocity component (VX) in a front and rear direction of the host vehicle MC.

As illustrated in FIG. 1C, the processing apparatus according to the embodiment first aligns the starting points of two projected ground velocities GV. The processing apparatus calculates the perpendicular lines VL that pass through the respective end points of the two projected ground velocities GV whose starting points are aligned. The processing apparatus calculates the intersection CP of two perpendicular lines VL. When there is one intersection CP, the processing apparatus according to the embodiment regards the aligned starting points of the projected ground velocities GV as a starting point of the motion vector V, and regards the intersection CP as an end point of the motion vector V. That is, a direction from the starting points of the projected ground velocities GV to the intersection CP indicates the actual movement direction of the target. A length between the starting points of the projected ground velocities GV and the intersection CP indicates a magnitude of the ground velocity of the target with respect to the movement direction.

As described above, the processing apparatus according to the embodiment can detect the movement direction of the target with one scan based on the plurality of the instantaneous data sets 100. Therefore, the target detection apparatus 1 including the processing apparatus according to the embodiment can improve the responsiveness to the target compared to the conventional target detection apparatus in which several scans have been required.

Furthermore, the target detection apparatus according to the embodiment estimates the motion vector V based on the ground velocity in the instantaneous data set 100, so that there is no need to consider changes of the host vehicle MC (velocity and position, etc.) compared to the relative velocity, Therefore, it is possible to further improve an estimation accuracy of the motion vector V.

When the target detection apparatus according to the embodiment needs only the movement direction of the target, the target detection apparatus according to the embodiment does not always need to calculate a distance between the starting points of the projected ground velocities GV and the intersection CP as the ground velocity with respect to the movement direction. That is, in a target detection method according to the embodiment, at least the movement direction of the target is estimated.

When there are three or more intersections CP, the target detection apparatus according to the embodiment calculates an inner center of a triangle that is formed by the intersections CP so as to estimate the movement direction of the target. Such a point will be described later.

Figure 2:
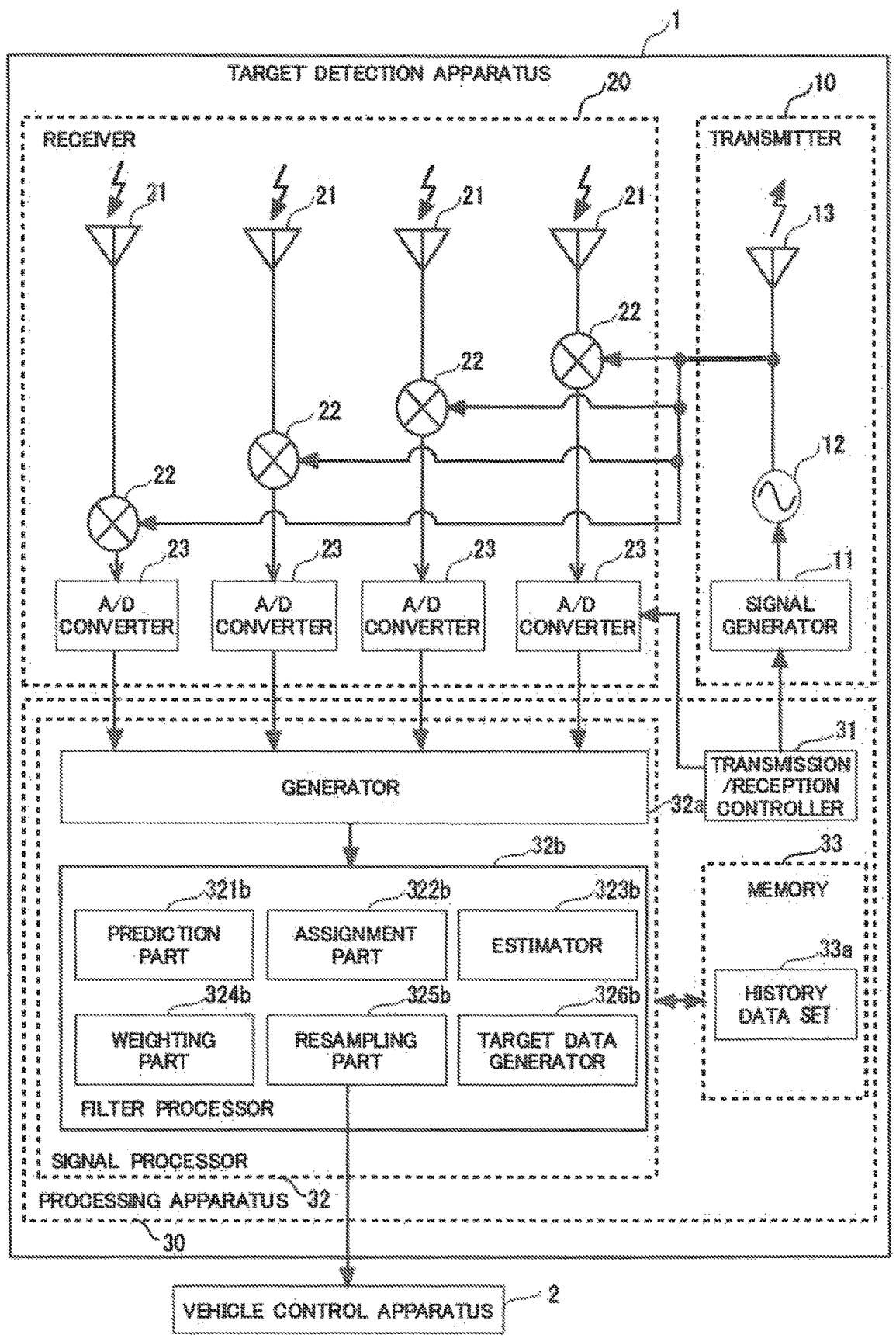
FIG. 2 is a block diagram illustrating a configuration of a radar apparatus according to the embodiment.

Next, with reference to FIG. 2, a configuration of the target detection apparatus that includes the processing apparatus according to the embodiment will be described in detail. FIG. 2 is a block diagram illustrating the configuration of the target detection apparatus according to the embodiment. In FIG. 2, only constituent elements necessary for describing the features of the embodiment is shown as functional blocks, and descriptions of general constituent elements will be omitted.

In other words, each constituent element shown in FIG. 2 is functionally conceptual, an does not necessarily need to be physically configured as shown. For example, specific forms of distribution and integration of each functional block are not limited to the forms shown in the drawings, and can be configured by physically or functionally distributing and integrating all or a part of the forms in arbitrary units according to various loads and usage situations.

As illustrated in FIG. 2, the target detection apparatus 1 includes a transmitter 10, a receiver 20 and a processing apparatus 30. The target detection apparatus 1 is connected to a vehicle control apparatus 2 that controls a behavior of the host vehicle MC.

Such a vehicle control apparatus 2 performs vehicle control, such as a PCS (Pre-crash Safety System) and an AEB (Advanced Emergency Braking System), based on a detection result of the target by the target detection apparatus 1.

The transmitter 10 includes a signal generator 11, an oscillator 12 and a transmitting antenna 13. The signal generator 11 generates a modulated signal for transmitting a millimeter wave frequency-modulated by a triangular wave by control of a transmission/reception controller 31 described later. The oscillator 12 generates a transmission signal based on the modulated signal generated by the signal generator 11, and outputs the transmission signal to the transmitting antenna 13. As illustrated in FIG. 2, the transmission signal generated by the oscillator 12 is also distributed to a mixer 22 described later.

The transmitting antenna 13 converts the transmission signal from the oscillator 12 into a transmission wave, and outputs the transmission wave to an outside of the host vehicle MC. The transmission wave output by the transmitting antenna 13 is a continuous wave frequency-modulated by the triangular wave. The transmission wave transmitted from the transmitting antenna 13 to the outside, for example, in a front direction of the host vehicle MC is reflected at the reflection points on another vehicle LC, and the like, and becomes a reflection wave.

The receiver 20 includes a plurality of receiving antennas 21 that form an alley antenna, a plurality of mixers 22 and a plurality of A/D converters 23. Each of the mixers 22 and each of the A/D converters 23 are provided to each of the receiving antenna 21.

Each of the receiving antennas 21 receives the reflection wave from each of the reflection points as a reception wave, converts the reception wave into a reception signal, and outputs the reception signal to the mixer 22. A number of the receiving antennas 21 illustrated in FIG. 2 is four, but may be less than or equal to three, or equal to five or more.

After the reception signal output from each of the receiving antennas 21 is amplified by an amplifier (not shown), for example, a low noise amplifier, and the amplified reception signal is input to the mixer 22. The mixer 22 mixes a portion of the distributed transmission signal and the reception signal input from each of the receiving antennas 21 and excludes unnecessary signal components to generate a beat signal, and outputs the beat signal to each of the A/D converters 23.

The beat signal has a beat frequency that is a frequency difference between a frequency of the transmission signal (hereinafter, referred to as a "transmission frequency") and a frequency of the reception signal (hereinafter, referred to as a "reception frequency"). The beat signal generated by the mixer 22 is converted into a digital beat signal by each of the A/D converters 23 after synchronizing a timing of the receiving antennas by a synchronizer (not shown). Then, the digital beat signal is output to the processing apparatus 30.

The processing apparatus 30 includes the transmission/reception controller 31, a signal processor 32 and a memory 33. The signal processor 32 includes a generator 32a and a filter processor 32b.

The memory 33 stores a set of history data 33a (hereinafter, referred to as a "history data set 33a"), The history data set 33a is information including a history of a set of target data (hereinafter, referred to as a "target data set") in a series of signal processes executed by the signal processor 32 and a history of the instantaneous data set 100. The history data set 33a includes information, such as the ground velocities of the reflection points with respect to the host vehicle MC and an angle corresponding to a direction to the host vehicle MC in the instantaneous data set 100. Such a point will be described later.

The processing apparatus 30 is, for example, a microcomputer including a CPU (Central Processing Unit), a ROM (Read Only Memory) or a RAM (Read Access Memory) corresponding to the memory 33, a resistor, other input/output ports, and the like, and controls an entire of the target detection apparatus 1.

The microcomputer CPU reads out and executes a program stored in the ROM, so that functions of the transmission/reception controller 31 and the signal processor 32 are implemented. The transmission/reception controller 31 and the signal processor 32 can be entirely configured by hardware such as an ASIC (Application Specific Integrated Circuit) or an FPGA (Field Programmable Gate Array).

The transmission/reception controller 31 controls the transmitter 10 including the signal generator 11 and the receiver 20. The signal processor 32 cyclically executes a series of signal processes. Subsequently, each constituent element of the signal processor 32 will be described.

The generator 32a generates the instantaneous data set 100. Specifically, the generator 32a performs a frequency analysis process, a peak extraction process and an instantaneous data generation process so as to generate the instantaneous data set 100.

In the frequency analysis process, a Fast Fourier Transform process (hereinafter, referred to as a "FFT process") is performed on the beat signal input from each of the A/D converters 23. A result of the FFT process is a frequency spectrum of the beat signal which is a power value (signal level) for each frequency of the beat signal (for each frequency bin set at frequency intervals according to frequency resolution).

In the peak extraction process, a peak frequency corresponding to a peak in the result of the FFT process by the frequency analysis process is extracted. In the peak extraction process, the peak frequencies are extracted in each of an "UP period" and a "DN period" of the beat signal described later.

In the instantaneous data generation process, an angle estimation process is performed to calculate an arrival angle of the reflection wave of the peak frequency extracted in the peak extraction process and its power value. At an execution time of the angle estimation process, since the arrival angles are angles at which the reflection points are estimated to exist, the arrival angles may be hereinafter referred to as an "estimated angle".

In the instantaneous data generation process, a pairing process is performed to determine a correct combination of the respective peak frequencies in the "UP period" and the "DN period" based on a calculation result of the calculated estimated angle and power value.

In the instantaneous data generation process, a distance between each of the reflection points and the host vehicle MC, and the projected relative velocities of the reflection points with respect to the host vehicle MC are calculated from a result of the determined combination. In the instantaneous data generation process, the calculated estimated angle, distance and projected relative velocity of each target are output to the filter processor 32b as the instantaneous data set 100 of the latest cycle (latest scan) and stored as the history data set 33a in the memory 33.

Figure 3:
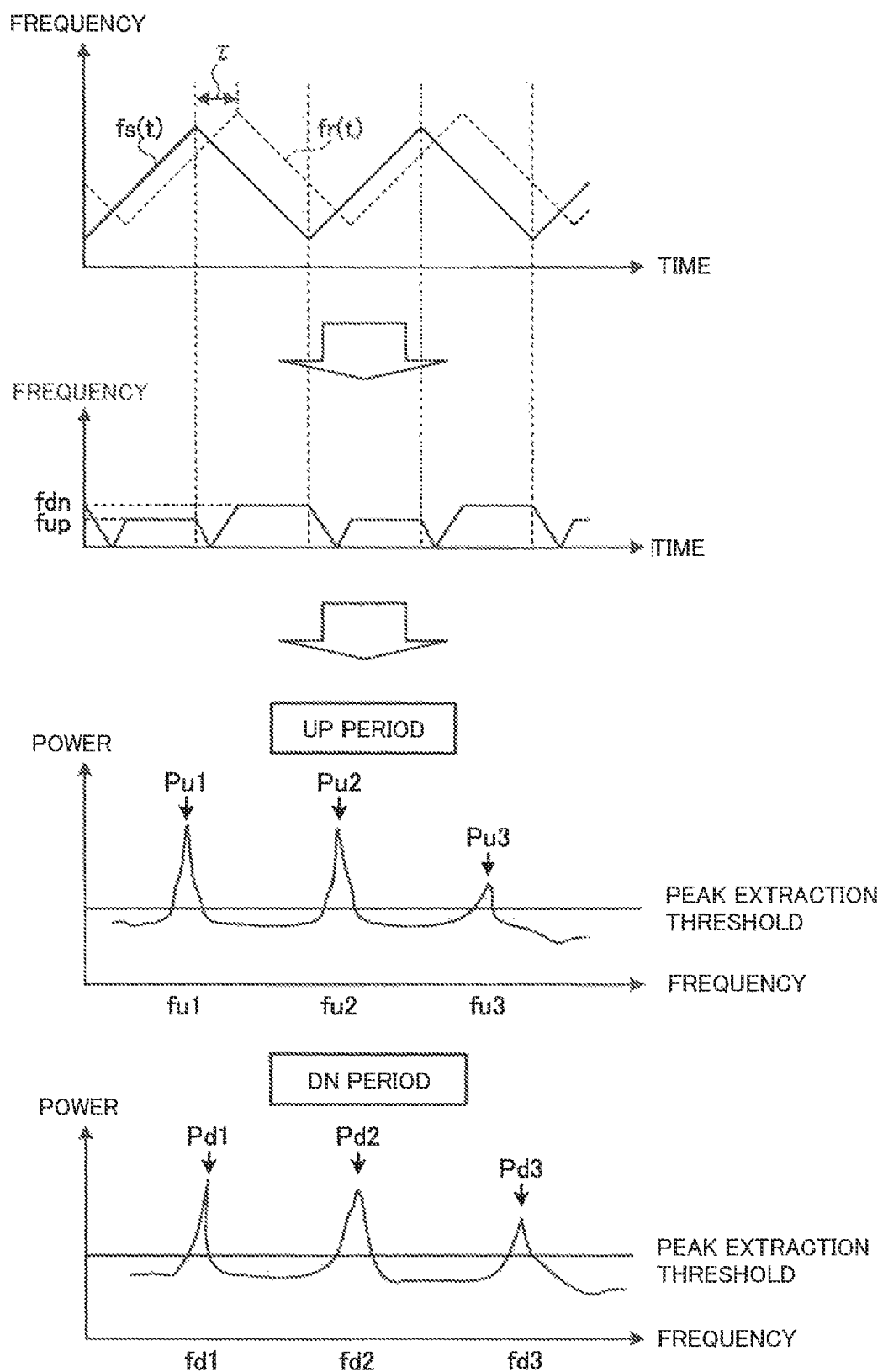
FIG. 3 illustrates processes from a pre-stage process of a signal processor to a peak extraction process in the signal processor.
Figure 4A:
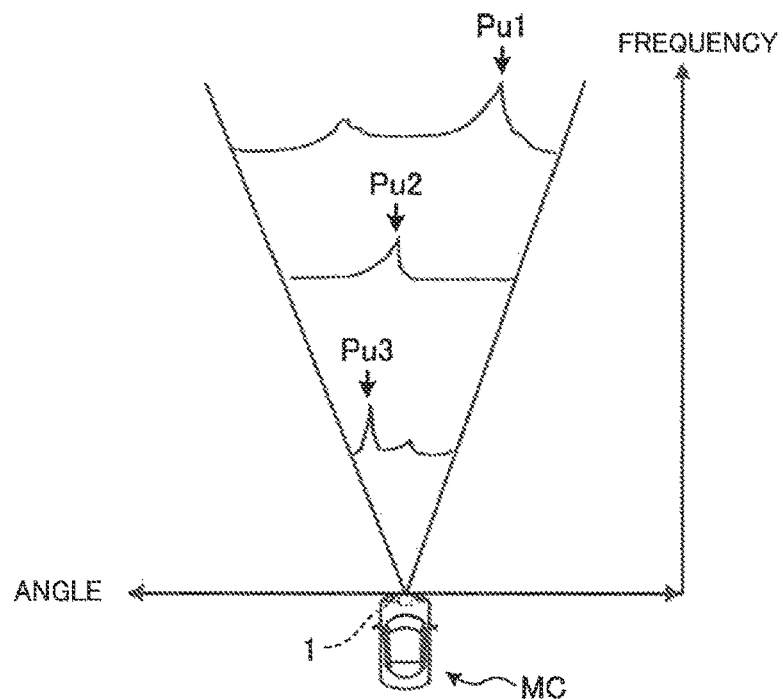
FIG. 4A illustrates an angle estimation process.
Figure 4B:
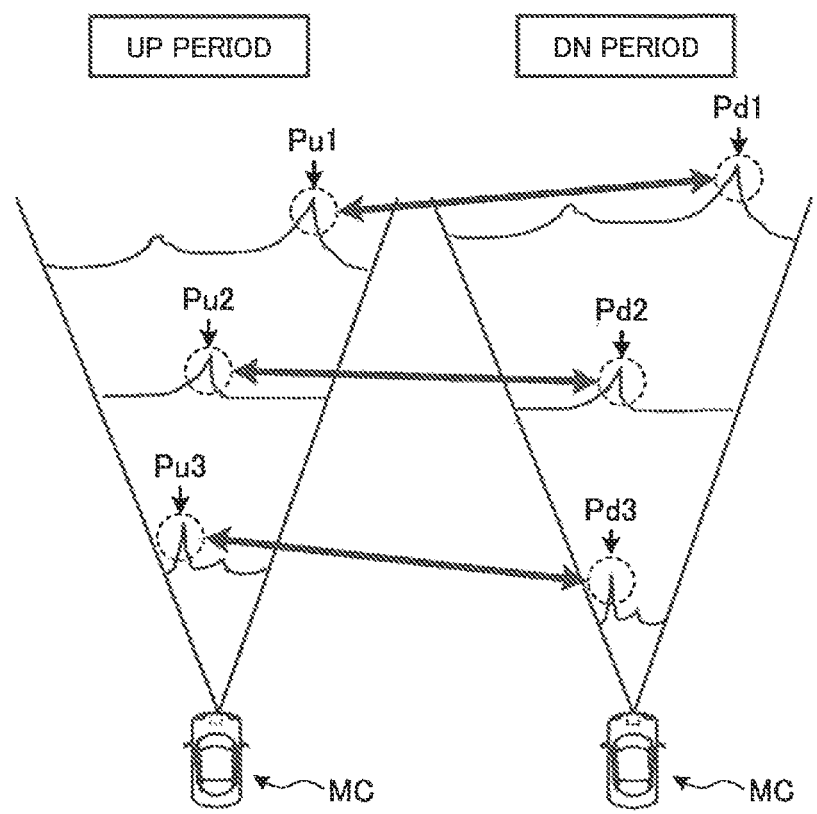
FIG. 4B illustrates a pairing process (No. 1)
Figure 4C:
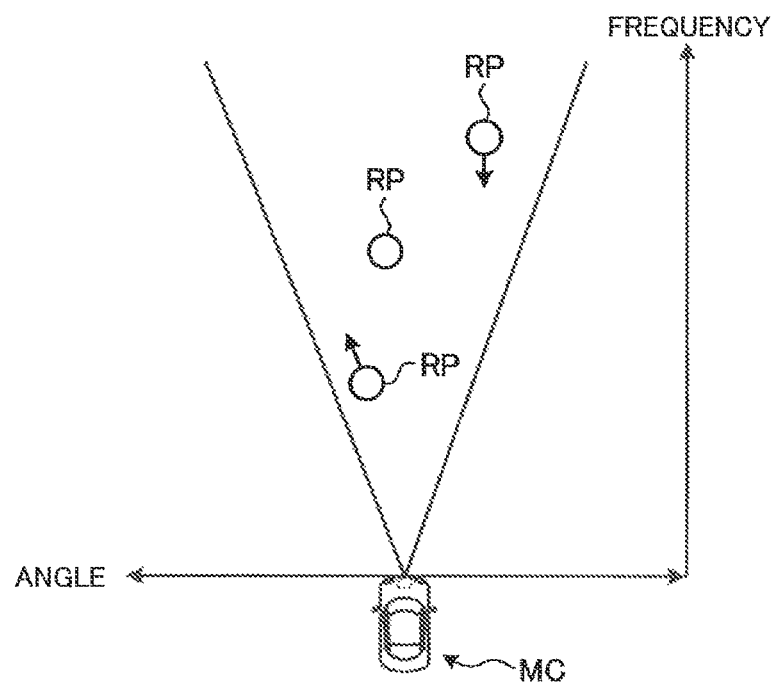
FIG. 4C illustrates a pairing process (No. 2)

FIG. 3 to FIG. 4C illustrate a flow of processes up to here in the signal processor 32 from a pre-stage process of the signal processor 32 for easier explanation. FIG. 3 is a process explanatory diagram from the pre-stage process of the signal processor 32 to the peak extraction process in the generator 32a.

FIG. 4A is a process explanatory diagram of the angle estimation process. FIG. 4B and FIG. 4C are process explanatory diagrams (No. 1) and (No. 2) of the pairing process. FIG. 3 is divided into three regions by two thick downward white arrows. The respective regions will be described as an upper stage, a middle stage and a lower stage.

As shown in the upper stage of FIG. 3, a transmission signal fs(t) is transmitted from the transmitting antenna 13 as the transmission wave, and thereafter is reflected on the target to arrive as the reflection wave, and received by the receiving antenna 21 as a reception signal fr(t).

At this time, as shown the upper stage of FIG. 3, the reception signal fr(t) is delayed by a time difference T with respect to the transmission signal fs(t) according to a distance between the host vehicle MC and the target. By the time difference T and a Doppler effect based on the relative velocity of the host vehicle MC and the target, the beat signal is acquired as a signal in which a frequency fup in the "UP period" (period in which a frequency goes up) and a frequency fdn in the "DN period" (period in which a frequency goes down) are repeated (refer to the middle stage of FIG. 3).

The lower stage of FIG. 3 schematic illustrates the result of the FFT process of the beat signal in the frequency analysis process for each of the "UP period" side and the "DN period" side.

As shown in the lowerstage of FIG. 3, after the FFT process, waveforms in respective frequency domains on the "UP period" side and the "DN period" side are obtained. The peak frequency corresponding to the peak is extracted.

For example, in an example shown in the middle stage of FIG. 3, a peak extraction threshold is used, and on the "UP period" side, peaks Pu1 to Pu3 are respectively determined as the peak and peak frequencies fu1 to fu3 are respectively extracted.

On the "DN period" side, the same peak extraction threshold is used, peaks Pd1 to Pd3 are respectively determined as the peak and peak frequencies fd1 to fd3 are respectively extracted.

Herein, the reflection waves from a plurality of the targets may be mixed in a frequency component of each peak frequency extracted by the peak extraction process. Therefore, in the instantaneous data generation process, the angle estimation process is performed to calculate a direction for each peak frequency and a presence of the corresponding target is analyzed for each peak frequency.

An azimuth calculation in the instantaneous data generation process can be performed using a known arrival direction estimation method, such as an ESPRIT (Estimation of Signal Parameters via Rotational Invariance Techniques).

FIG. 4A schematically illustrates an azimuth calculation result of the instantaneous data generation process. In the instantaneous data generation process, estimated angles of respective targets (respective reflection points) respectively corresponding to the peaks Pu1 to Pu3 are calculated from the peaks Pu1 to Pu3 of the azimuth calculation result. A magnitude of each of the peaks Pu1 to Pu3 is the power value. In the instantaneous data generation process, as shown in FIG. 4B, the angle estimation process is performed for each of the "UP period" side and the "DN period" side.

In the instantaneous data generation process, the pairing process is performed to combine peaks that have close estimated angles and power values in the azimuth calculation result. From a result of the combination, in the instantaneous data generation process, the distance of each target (each of the reflection points) corresponding to each combination of the peaks and the projected relative velocities of the reflection points with respect to the host vehicle MC are calculated.

The distance is calculated based on a relation of a "distance ∝ (fup+fdn)". An absolute value of the projected relative velocity is calculated based on a relation of the "absolute value of the projected relative velocity ∝ (fup−fdn)". As a result, as shown in FIG. 4C, a pairing process result that indicates the instantaneous data set 100 having the estimated angle, distance and projected relative velocity of each of reflection points PR with respect to the host vehicle MC is obtained.

Referring back to FIG. 2, the filter processor 32*b* will be described. As shown in FIG. 2, the filter processor 32*b* includes a prediction part 321*b*, an assignment part 322*b*, an estimator 323*b*, a weighting part 324*b*, a resampling part 325*b* and a target data generator 326*b*.

The filter processor 32*b* uses a particle filter that assigns a predetermined amount of particle data (hereinafter, referred to as "particle data set") to the instantaneous data set 100 generated by the generator 32*a* so as to generate the target data set corresponding to the instantaneous data set 100.

The prediction part 321*b* performs a prediction process of sample points (particle data set) in the particle filter. Specifically, when the latest cycle is referred to as a time t and a distribution state of the particle data set at the time t is referred to as a distribution state Xt, the prediction part 321*b* arranges (samples) N particle data set based on a probability density function based on a distribution state Xt−1 at a time t−1 of a previous cycle. That is, in the prediction process, the prediction part 321*b* distributes the particle data set in a region in which the instantaneous data set 100 is likely to appear at the time t from the particle data set at the time t−1.

The prediction part 321*b* generates a set of prediction data (hereinafter, referred to as a "prediction data set") corresponding to a current target data set based on the previous target data set. Specifically, the prediction part 321*b* generates the prediction data set based on the movement direction of the previous target data set and the relative velocity with respect to the movement direction.

Since there is no particle data set of the previous cycle for the instantaneous data set 100 corresponding to a new target, the prediction part 321*b* distributes the particle data set in a predetermined distribution state.

The prediction part 321*b* generates the prediction data set based on the relative velocity with respect to the movement direction, but is not limited thereto. For example, the prediction part 321*b* may generate the prediction data set based on the ground velocity with respect to the movement direction. The prediction process using the ground velocity will be described with reference to FIG. 5.

Figure 5:
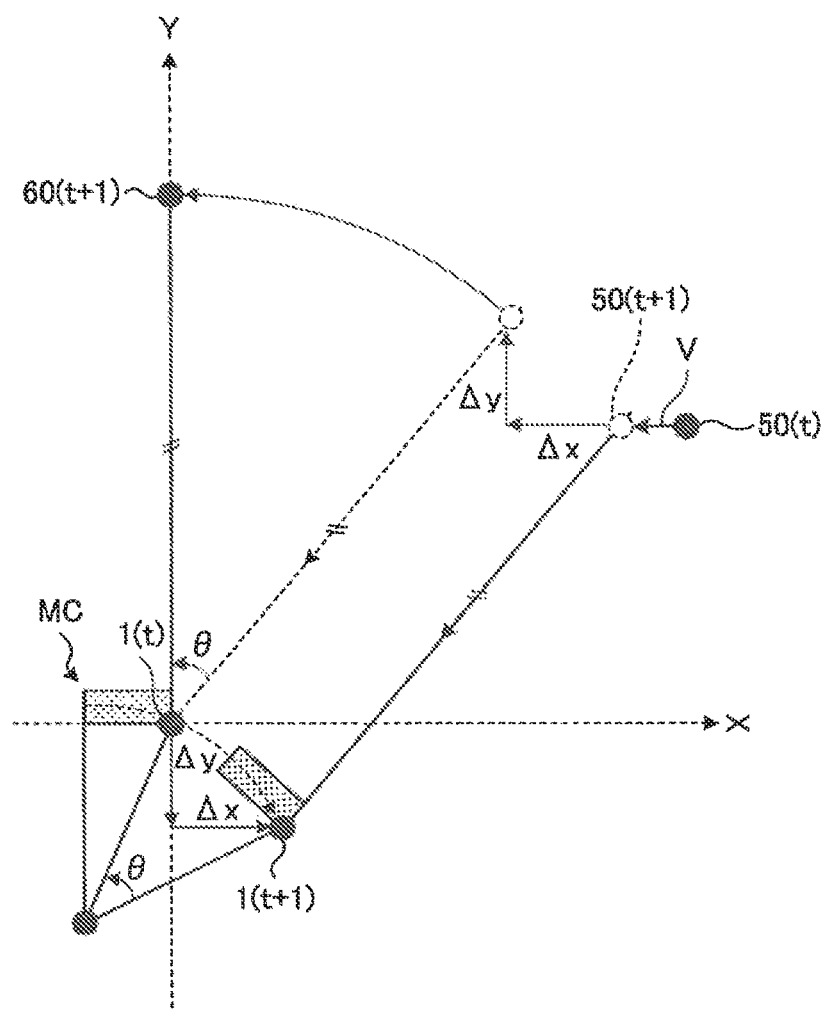
FIG. 5 illustrates a prediction process based on a ground velocity.

FIG. 5 illustrates the prediction process based on the ground velocity. A calculation method of the ground velocity will be described later. First, as an example, a case in which the target detection apparatus 1 (*t*) at the time t turns right forward and moves to the target detection apparatus 1 (t+1) at a time t+1 will be considered. In this case, the prediction process for predicting a prediction data set 60 (t+1) at the time t+1 from a target data set 50 (*t*) at the time t will be described. This prediction process can be also regarded as a process for performing a prediction of the target data set itself and a coordinate system transformation in accordance with a movement of the host vehicle MC. Hereinafter, a procedure in which the prediction of the target data set itself is first performed, and thereafter the coordinate system transformation is performed will be described by taking as an example. There is no problem even when the coordinate system transformation is first performed, and thereafter the prediction of the target data set itself is performed.

As shown in FIG. 5, the prediction part 321*b* first moves the target data set 50(*t*) by the motion vector V (ground velocity) to generate a temporal data set 50(*t*+1) before the coordinate system transformation. That is, a movement destination of the target represented by the coordinate system based on a position and direction of the host vehicle MC at the time t that is a previous measurement time is predicted as the temporal data set 50(*t*+1).

Based on a state of the host vehicle MC at the time t, the position and direction of the target detection apparatus 1 (t+1) at the time t+1 that are an origin and reference direction after the coordinate system transformation are predicted. Specifically, the prediction part 321*b* predicts the position of the target detection apparatus 1 (t+1) at the time t+1 based on a traveling velocity and turning radius of the host vehicle MC. More specifically, the prediction part 321*b* predicts a position change (Δx and Δy) in an XY plane from the time t to the time t+1, and a direction change, i.e., a rotation angle θ. That is, at this time, a translational movement amount and rotational movement amount of the host vehicle MC are obtained.

The prediction portion 321*b* determines a prediction position of the prediction data set 60(*t*+1) based on the position change (Δx and Δy) and the rotation angle θ. That is, the coordinate system transformation with respect to the temporal data set 50(*t*+1) is performed based on the translational movement amount and rotational movement amount. Specifically, the prediction part 321*b* first performs a translational movement transformation with respect to the temporal data set 50(*t*+1). More specifically, the temporal data set 50(*t*+1) is moved based on the position change (Δx and Δy). Next, the prediction part 321*b* performs a rotational movement transformation. Specifically, the temporal data set 50(*t*+1) after the translational movement transformation is rotated by the rotation angle θ. When the translational movement transformation is first performed, a center of a rotation (origin) in a rotational movement corresponds to a position of the actual center of the rotation (target detection apparatus 1 (t+1)). That is, the prediction part 321*b* generates a position of the prediction data set 60(*t*+1) when the position and direction of the target detection apparatus 1 at the time t+1 are set to the origin and reference direction based on a change amount of the target detection apparatus 1 from the time t to the time t+1. As a result, the position change from the target data set 50(*t*) to the prediction data set 60(*t*+1) in the case where the positions of the target detection apparatus 1(*t*) and the target detection apparatus 1 (t+1) are aligned to the origin of the XY plane can be predicted. In the above example, the translational movement transformation and rotational movement transformation are separately applied, but the invention is not limited thereto. For example, the translational movement transformation and rotational movement transformation may be also combined and described as a single linear transformation matrix. The rotational movement amount is described using the rotation angle θ as a variable, but is not limited thereto. There is no problem even when the rotational movement amount is described using a direction vector, a complex number, a quaternion, and the like. There are various methods of the coordinate system transformation, and the methods are selected depending on requirements.

Referring back to FIG. 2, the assignment part 322*b* will be described. The assignment part 322*b* performs a process for assigning the instantaneous data set 100 in the latest cycle to the latest particle data set that is a prediction result of the prediction part 321*b*. Specifically, the assignment part 322*b* assigns the particle data set corresponding to the prediction data set to the instantaneous data set 100 that exists in a predetermined assignment range corresponding to the prediction data set generated by the prediction part 321*b*.

When there is the instantaneous data set 100 that does not exist in any assignment range of the target data set, the assignment part 322*b* treats the instantaneous data set 100 as the new target.

The estimator 323*b* estimates the motion vector V of the target based on the plurality of the instantaneous data sets 100 generated by the generator 32*a*. Specifically, based on the relative velocities of the reflection points with respect to the host vehicle MC in the instantaneous data set 100, the estimator 323*b* calculates the projected ground velocities GV that indicate the ground velocities of the reflection points with respect to the host vehicle MC respectively corresponding to the plurality of the instantaneous data sets 100, aligns the starting points of the projected ground velocities GV to a predetermined point and estimates the motion vector V of the target from the intersection CP of the perpendicular lines VL to the projected ground velocities GV.

Figure 6:
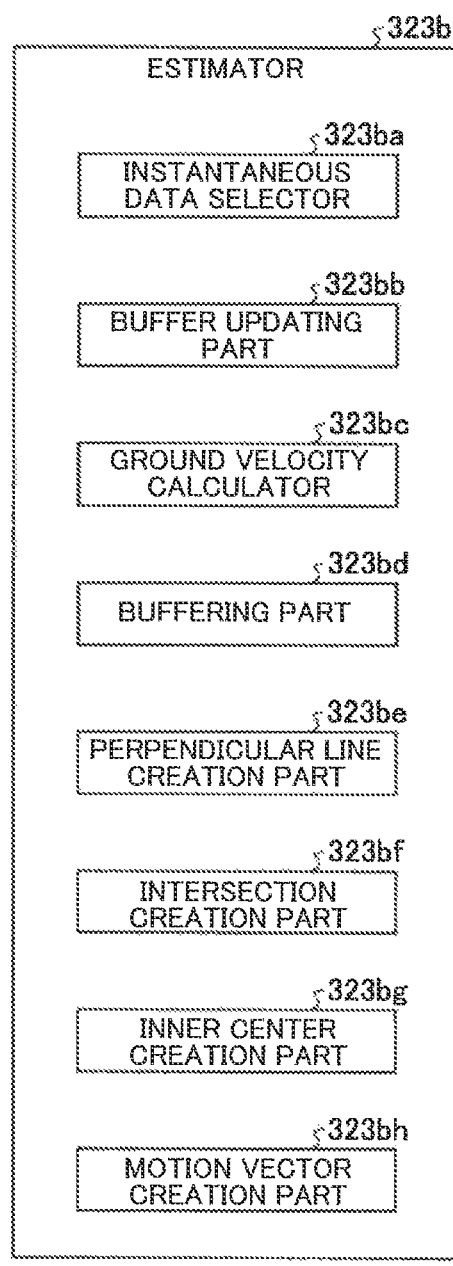
FIG. 6 is a functional block diagram of an estimator.

With reference to FIG. 6 to FIG. 10, process contents of the estimator 323*b* will be specifically described. FIG. 6 is a functional block diagram of the estimator 323*b*. The estimator 323*b* includes an instantaneous data selector 323*ba*, a buffer updating part 323*bb*, a ground velocity calculator 323*bc*, a buffering part 323*bd*, a perpendicular line creation part 323*be*, an intersection creation part 323*bf*, an inner center creation part 323*bg* and a motion vector creation part 323*bh*.

The instantaneous data selector 323*ba* selects the instantaneous data set 100 that is used for an estimation process of the motion vector V. Specifically, the instantaneous data selector 323*ba* performs a process for excluding the instantaneous data set 100 that is unnecessary in the estimation process of the motion vector V based on the relative velocities (projected relative velocities RV) of the reflection points with respect to the host vehicle MC and the angle and distance corresponding to the direction to the host vehicle MC included in the instantaneous data set 100.

For example, the instantaneous data selector 323*ba* excludes the instantaneous data set 100 having a similar direction of the projected relative velocity RV among the plurality of the instantaneous data sets 100 from the estimation process of the motion vector. Specifically, the instantaneous data selector 323*ba* selects any one of the two instantaneous data sets 100 when an angle difference between the two instantaneous data sets 100 is less than a predetermined threshold value (e.g., nearly zero).

In this case, the instantaneous data selector 323*ba* selects, for example, the instantaneous data set 100 having a distance closer to the host vehicle MC or a greater power value from among the two instantaneous data sets 100. This is because there is a low possibility that the two instantaneous data sets 100, each having substantially the same angle and a different absolute value of the projected relative velocity RV, are obtained from the same target. Furthermore, the two instantaneous data sets 100, each having substantially the same angle corresponding to the direction to the host vehicle MC and the same absolute value of the projected relative velocity RV, are considered to derive from the reflection points located at substantially the same position in the target, and in the estimation process of the motion vector V, only any one of the two instantaneous data sets 100 is sufficient to use as information. Therefore, the other one instantaneous data set 100 is excluded.

As described above, among the plurality of the instantaneous data sets 100, each having substantially the same angle, at least one instantaneous data set 100 is kept and the remaining instantaneous data sets 100 are excluded. As a result, it is possible to prevent throughput in the estimation process by the estimator 323*b* from increasing without lowering the estimation accuracy of the motion vector V.

The instantaneous data selector 323*ba* excludes the instantaneous data set 100 having similar projected relative velocities of the reflection points with respect to the host vehicle MC and similar distances between the host vehicle MC and the reflection points among the plurality of the instantaneous data sets 100 from the estimation process of the motion vector V.

Specifically, when a difference in a magnitude of the projected relative velocities RV between the two instantaneous data sets 100 is less than a predetermined threshold value (e.g., nearly zero) and a distance difference is less than a predetermined threshold value (e.g., nearly zero), the instantaneous data selector 323*ba* selects any one of the two instantaneous data sets 100. In this case, the instantaneous data selector 323*ba* selects the instantaneous data set 100 having a greater power value of the angle or an angle closer to the target data set. This is because there is a high possibility that the two instantaneous data sets 100, each having substantially the same magnitude of the projected relative velocity RV and substantially the same distance, are the instantaneous data sets 100 of different targets.

As a result, it is possible to prevent the estimation accuracy of the motion vector V by using the instantaneous data sets 100 of other targets from lowering and prevent throughput in the estimation process by the estimator 323*b* from increasing.

The projected ground velocity GV may be calculated before a process by the instantaneous data selector 323*ba*. The instantaneous data selector 323*ba* may perform the above described process using the projected ground velocity GV instead of the projected relative velocity RV.

Next, the buffer updating part 323*bb* performs an updating process of the history data 33*a* stored in the memory 33. The updating process by the buffer updating part 323*bb* is performed, for example, before adding a new instantaneous data set 100 selected by the instantaneous data selector 323*ba* to the history data 33*a*. However, the updating process may be performed at any timing as long as the updating process is performed once a measurement cycle. The timing of performing the updating process may be set according to a relation between process contents and buffer contents. Specifically, when the buffer updating part 323*bb* stores the new instantaneous data set 100 as the history data set 33*a*, the buffer updating part 323*bb* corrects the angle corresponding to the direction to the host vehicle MC in the past instantaneous data set 100 stored in the history data set 33*a* based on the change amount of the rotation angle of the host vehicle MC. Here, the updating process by the buffer updating part 323*bb* will be more specifically described with reference to FIG. 7.

FIG. 7 illustrates the updating process by the buffer updating part 323*bb*. FIG. 7 shows the history data sets 33*a* before and after the updating process. Specifically, the history data set 33*a* includes items, such as an "TD", the "absolute value of the projected relative velocity", an "absolute value of the projected ground velocity", the "angle" and a "storage lapse count".

The "ID" is identification information for identifying each of the instantaneous data sets 100. The "absolute value of the projected relative velocity" indicates the projected relative velocities of the reflection points with respect to the host vehicle MC in the instantaneous data set 100, that is, the absolute value of the projected relative velocity RV. The "absolute value of the projected ground velocity" indicates the projected ground velocities of the reflection points with respect to the host vehicle MC calculated by the ground velocity calculator 323bc described later, that is, an absolute value of the projected ground velocity GV. The "angle" is the angle estimated in the angle estimation process in the instantaneous data generation process and corresponds to the direction to the host vehicle MC. Specifically, the "angle" indicates an angle in a left and right direction when a front direction of the host vehicle MC is zero. The "storage lapse count" indicates a cycle that has elapsed from the latest cycle. For example, the storage lapse count "1" indicates a cycle one before the latest cycle, that is, the instantaneous data set 100 obtained at the time t−1.

As shown in FIG. 7, the buffer updating part 323bb updates the "angle" and "storage lapse count" in the history data set 33a based on the change amount of the rotation angle of the host vehicle MC. The change amount of the rotation angle of the host vehicle MC is a rotation angle in a horizontal direction associated with turning of the host vehicle MC. Specifically, the change amount ($\theta$) of the rotation angle is calculated by the following equation when the traveling velocity of the host vehicle MC is Vself, the turning radius of the host vehicle MC is crvR and a time change amount is $\Delta t$. That is, the equation is expressed as follows: $\theta$ [rad]=Vself×$\Delta t$/crvR. A turning direction (left or right direction), that is, a positive or negative value of $\theta$ is determined by using information, such as a steering angle.

In an example shown in FIG. 7, it is assumed that the change amount ($\theta$) of the rotation angle of the host vehicle MC is −3 degrees (e.g., turning right forward). In this case, the buffer updating part 323bb subtracts 3 degrees from the "angle" in all the past instantaneous data sets 100 included in the history data set 33a. In terms of the change amount, "3 degrees" are added. The buffer updating part 323bb increases the "storage lapse count" in all the past instantaneous data sets 100 by "1". These past instantaneous data sets 100 are used in the subsequent estimation process of the motion vector V when the storage lapse count in the new instantaneous data set 100 is less than a predetermined number.

That is, the buffer updating part 323bb applies the coordinate system transformation associated with turning of the host vehicle MC performed by the prediction part 321b to the past instantaneous data set 100. The stored past instantaneous data set 100 has a current direction of the host vehicle MC in a current coordinate system in the same manner as a current instantaneous data set 100. As a result, in the subsequent estimation process of the motion vector V, the angle in the past instantaneous data set 100 is aligned with the "angle" in the latest instantaneous data set 100 as a reference. Therefore, in the estimation process of the motion vector V, the past instantaneous data set 100 can be used in the same manner as the current instantaneous data set 100, and thus, the estimation accuracy is improved.

In FIG. 7, although a case of adding the "angle" in the instantaneous data set 100 has been described, when the change amount of the rotation angle of the host vehicle MC is a positive value (e.g., turning left forward), the value is subtracted from the "angle" in the instantaneous data set 100. In the above, a method of correcting the angle in the history data set 33a every time, but the invention is not limited thereto. For example, there is also a method of recording only the change amount $\theta n$ of the rotation angle of the host vehicle MC at each measurement timing n, and continuously subtracting $\theta n$ when using the history data set 33a. In this case, the corrected angle $\theta$ with respect to the history data set 33a at a time t−k is represented by the following equation: $\theta = \theta n + \theta n-1 + \ldots + \theta n-k$. $\theta n$ may be not the change amount of the rotation angle but may be an integrated value, that is, an angle of the host vehicle itself at each measurement timing n. In that case, the angle is represented by the following equation: $\theta = \theta n - \theta n-k$. The direction of the host vehicle directly measured using an electronic compass instead of the velocity and turning radius may be used. Furthermore, although the angle has been exemplified, the direction vector may be used, and an arithmetic operation using a complex number or a quaternion may be used. There are various methods of the coordinate system transformation of the rotational movement, which can be appropriately selected according to a purpose of use.

As shown in FIG. 7, the buffer updating part 323bb deletes the instantaneous data set 100 in which the "storage lapse count" is equal to or more than the predetermined number ("3" in FIG. 7) from the history data set 33a. This is a process for excluding the instantaneous data set 100 that is outdated information and low in reliability. As a result, in the subsequent estimation process of the motion vector V, the instantaneous data set 100 that is low in reliability is not used. Therefore, the estimation accuracy of the motion vector V is improved. In the above, the instantaneous data set 100 in which the storage lapse count is equal to or more than the predetermined number is deleted, but the method is not limited thereto. Conversely, there is a method of recording a predetermined lifetime count, subtracting the count in the updating process and excluding the instantaneous data set 100 when the count becomes 0. Furthermore, there is a method of recording a measurement time and deleting the past history data set 33a stored a predetermined time before a current measurement time without updating the history data set 33a. There are various methods which can be appropriately selected according to a purpose of use.

Figure 8:
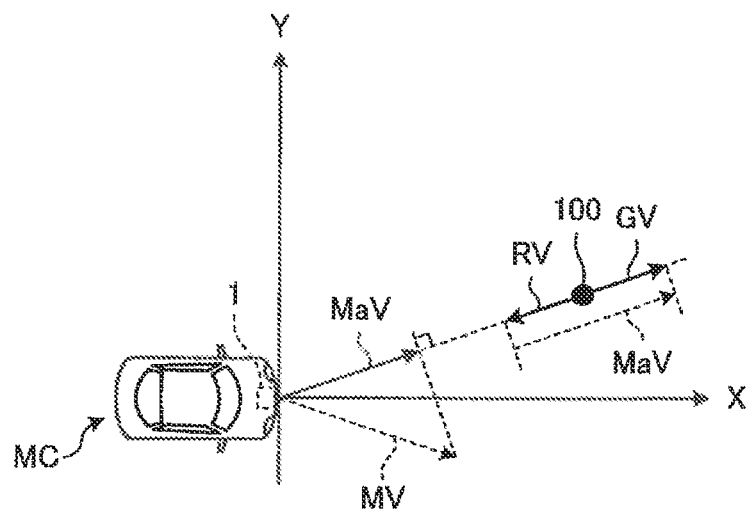
FIG. 8 illustrates a calculation process of the projected ground velocity by a ground velocity calculator.

Next, the ground velocity calculator 323bc excludes a velocity component of the host vehicle MC from the relative velocities (projected relative velocities RV) of the reflection points with respect to the host vehicle MC included in the instantaneous data set 100 selected by the instantaneous data selector 323ba to calculate the ground velocity. The projected relative velocity RV in the instantaneous data set 100 includes an apparent velocity component associated with the movement of the host vehicle MC and the velocity component associated with the actual movement of the reflection points, and in the ground velocity calculator 323bc, the latter velocity component associated with the actual movement of the reflection points is extracted. With reference to FIG. 8, a calculation process of the ground velocity will be described.

FIG. 8 illustrates the calculation process of the ground velocity by the ground velocity calculator 323bc. FIG. 8 illustrates the ground velocity of the host vehicle MC (self-motion vector MV). The ground velocity calculator 323bc first calculates the ground velocity (projected self-motion vector MaV) of the host vehicle with respect to the instantaneous data set 100 based on the self-motion vector MY. The projected self-motion vector MaV is the apparent velocity component associated with the movement of the host vehicle MC in the projected relative velocity RV.

The ground velocity calculator 323*bc* adds the projected self-motion vector MaV to the projected relative velocity RV of the instantaneous data set 100 to calculate the projected ground velocity GV indicating the ground velocity with respect to the host vehicle MC.

Next, the buffering part 323*bd* stores the new instantaneous data set 100 selected by the instantaneous data selector 323*ba* in the history data set 33*a* of the memory 33. The "storage lapse count" of the new instantaneous data set 100 in the history data set 33*a* is appropriately set to an initial value, for example, "0".

Next, the perpendicular line creation part 323*be* creates the perpendicular line VL to the projected ground velocity (projected ground velocity GV) of the reflection points with respect to the host vehicle MC included in the instantaneous data set 100 calculated by the ground velocity calculator 323*bc*.

Specifically, with respect to the projected ground velocities GV respectively corresponding to the plurality of the instantaneous data sets 100, the perpendicular line creation part 323*be* creates the perpendicular lines VL that pass through the respective end points of the projected ground velocities GV when aligning the starting points of the projected ground velocities GV to a predetermined point.

For example, it is assumed that the perpendicular line creation part 323*be* aligns the starting points of the projected ground velocities GV to the origin of the plane represented by the ground velocity component (VY axis) in the left and right direction of the host vehicle MC and the ground velocity component (VX axis) in the front and rear direction of the host vehicle MC (refer to FIG. IC).

In this case, a linear expression of the perpendicular line VL is represented by the following equation: $VY=a \times VX+b$. Specifically, when the VX axis of the projected ground velocity GV is used as a reference of an angle $\alpha$ and a magnitude of the projected ground velocity GV is used as a ground velocity Ta, a coefficient a is represented by the following equation: $a=\tan(\alpha+\pi/2)$ and the coefficient b is represented by the following equation: $b=Ta/\sin(\alpha)$. In the case of $\alpha=0$ or $\pm 2\pi$, since the coefficient a diverges, an exception process is performed with Vx=V in the subsequent process.

When an amount of the latest instantaneous data set 100 is insufficient, the perpendicular line creation part 323*be* performs a perpendicular line creation process using the past instantaneous data set 100 in the history data set 33*a*. That is, when the amount of the latest instantaneous data set 100 is less than a predetermined amount, the perpendicular line creation part 323*be* creates a perpendicular line using the history data set 33*a* (a part of the past instantaneous data set 100) stored in the memory 33.

As a result, it is possible to suppress towering of the estimation accuracy of the motion vector V due to a lack of the amount of the instantaneous data set 100.

The intersection creation part 323*bf* creates the intersection CP of the perpendicular lines VL created by the perpendicular line creation part 323*be*. Specifically, it is assumed that the two perpendicular lines VL to obtain the intersection CP are n1 and n2. A coefficient a and a coefficient b of n1 are represented by a [n1] and b [n1], respectively. In this case, a coordinate system VX of the intersection CP is calculated by $VX=(b[n2]-b[n1])/(a[n1]-a[n2])$. A coordinate system VY of the intersection CP is calculated by substituting the above VX into $VY=a \times VX+b$. The intersection creation part 323*bf* calculates the intersections for all combinations of the perpendicular lines in the above procedure.

When there are three or more intersections CP created by the intersection creation part 323*bf*, the inner center creation part 323*bg* creates an inner center IP (refer to FIG. 9A) of a triangle that is formed by the three intersections CP. A method of creating the inner center IP by the inner center creation part 323*bg* will be described in FIG. 9A later.

The motion vector creation part 323*bh* creates the motion vector V of the target based on the intersection CP created by the intersection creation part 323*bf*. For example, when there is one intersection CP created by the intersection creation part 323*bf*, the motion vector creation part 323*bh* estimates that a starting point of a vector RV (origin of the VY axis and VX axis) is the starting point of the motion vector V and the intersection CP is the end point of the motion vector V.

That is, based on the motion vector V created by the motion vector creation part 323*bh*, the estimator 323*b* estimates that a direction from a starting point of the projected ground velocity GV to the intersection CP is the actual movement direction of the target and a distance between the starting point of the projected ground velocity GV and the intersection CP is the ground velocity of the target with respect to the movement direction.

When there are three or more intersections CP created by the intersection creation part 323*bf*, the motion vector creation part 323*bh* creates the motion vector V based on the inner center IP created by the inner center creation part 323*bg*. Here, a method of creating the motion vector V in the case of three or more intersections CP will be described with reference to FIG. 9A and FIG. 9B.

Figure 9A:
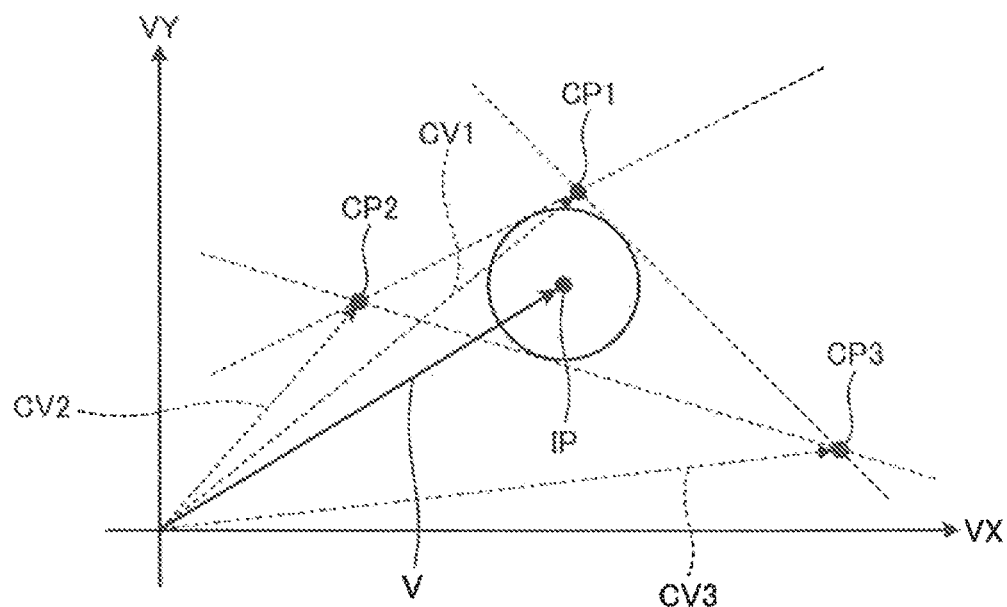
FIG. 9A illustrates a method of creating a motion vector when there are three intersections.
Figure 9B:
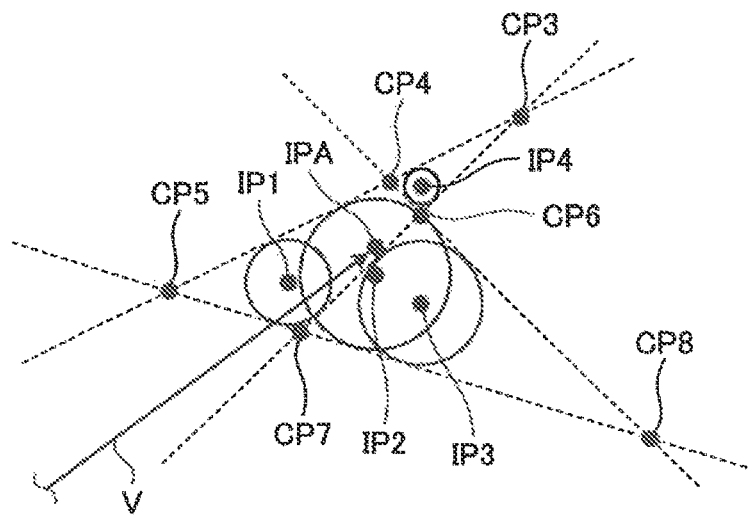
FIG. 9B illustrates a method of creating the motion vector when there are six intersections.

FIG. 9A illustrates the method of creating the motion vector V in the case of three intersections CP. FIG. 9B illustrates the method of creating the motion vector V in the case of six intersections CP. First, with reference to FIG. 9A, the method of creating the motion Vector V in the case of three intersections CP will be described.

First, the inner center creation part 323*bg* creates the inner center IP of a triangle that is formed by three intersections CP1, CP2 and CP3. The inner center IP is a center of an inscribed circle of the triangle that is formed by the three intersections CP1, CP2 and CP3.

More specifically, the inner center creation part 323*bg* creates calculation vectors CV1, CV2 and CV3, each respectively having the origin in the plane of the VY axis and the VX axis as starting points and each respectively having the intersections CP1, CP2 and CP3 as end points.

The inner center creation part 323*bg* creates the inner center IP based on the calculation vectors CV1, CV2 and CV3, and opposite sides of the intersections CP1, CP2 and CP3. Specifically, when lengths of the opposite sides of the intersections CP1, CP2 and CP3 are respectively represented by CP1*a*, CP2*a* and CP3*a*, the inner center creation part 323*bg* calculates a vector (motion vector V in FIG. 9A) from the origin to the inner center IP as $V=(CP1a \times CV1+CP2a \times CV2+CP3a \times CV3)/(CP1a+CP2a+CP3a)$.

When an amount of variation of the three intersections CP forming the triangle is equal to or more than a predetermined value, the inner center creation part 323*bg* excludes the three intersections from a calculation process of the inner center IP. Specifically, when an unbiased variance of the three intersections CP is equal to or more than predetermined value, the inner center creation part 323*bg* excludes the three intersections CP from the calculation process of the inner center IP.

When there is one inner center IP, the motion vector creation part 323*bh* creates a vector from the origin to the inner center IP as the motion vector V. As described above, by calculating the inner center IP and creating the motion vector V, even when there is a plurality of the intersections CP, it is possible to prevent the estimation accuracy of the motion vector V from lowering.

In the case where it is clear that an error between any two of the calculation vectors CV1, CV2 and CV3 is equal to or more than a predetermined value, and other cases, the motion vector creation part 323*bh* may use the remaining one calculation vector as the motion vector V.

Next, with reference to FIG. 9B, the method of creating the motion vector V in the case of six intersections CP will be described. As illustrated in FIG. 9B, when there are six intersections CP3 to CP8, there is a plurality of triangles that are formed by the intersections CP3 to CP8. Therefore, a plurality of inner centers IP1 to IP4 is created. In an example shown in FIG. 9B, there is a combination of the intersections CP in which a triangle is not formed by three intersections CP (e.g., the intersections CP3, CP5 and CP8), and such a combination of the intersections CP is excluded from a creation process of the inner center IP.

As illustrated in FIG. 9B, for example, the motion vector creation part 323*bh* calculates an average point IPA, which is an average of the inner centers IP1 to IP4, and calculates a vector from the origin to the average point IPA as the motion vector V.

As described above, when the plurality of the inner centers IP is created, by creating the motion vector V by the average point IPA, it is possible to minimally suppress an estimation error of the motion vector V due to variation of the inner centers IP.

When an amount of variation of the plurality of the inner centers IP is equal to or more than a predetermined value, the motion vector creation part 323*bh* excludes the inner centers IP from a creation process of the motion vector V. Specifically, the motion vector creation part 323*bh* excludes the inner centers IP in which the unbiased variance is equal to or more than a predetermined value, among the plurality of the inner centers IP, from the creation process of the motion vector V.

Referring back to FIG. 2, the weighting part 324*b* will be described. The weighting part 324*b* weighs each of the current particle data sets with respect to the current instantaneous data set 100 and the current particle data set that are in an assignment relationship.

For example, the weighing part 324*b* among the current particle data sets, increases a weight of the particle data set that is close to the current instantaneous data set 100 and decreases the weight of the particle data set that is far from the current instantaneous data set 100. The words "close" and "far" here mean that Mahalanobis distance is "close" and far".

Figure 10:
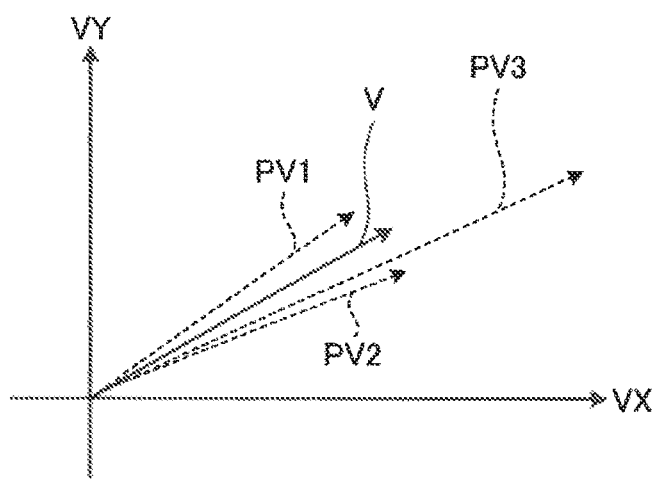
FIG. 10 illustrates a weighting process based on the motion vector.

The weighting part 324*b* performs a weighting process based on the motion vector V estimated by the estimator 323*b*. Here, such a point will be described with reference to FIG. 10. FIG. 10 illustrates the weighting process based on the motion vector V.

FIG. 10 illustrates a case in which starting point of vectors PV1 to PV3 based on three particle data sets and the starting point of the motion vector V are aligned to the origin in the plane of the VY axis and the VX axis. The vectors PV1 to PV3 based on the particle data sets are vectors from the previous particle data sets to the current particle data sets (particle data set predicted by the prediction part 321*b*).

For example, the weighting part 324*b* increases the weight as a similarity between the vectors PV1 to PV3 and the motion vector V is higher. For example, the weighting part 324*b* increases the similarity as the ground velocity components of the vectors PV1 to PV3 and the motion vector on the VY axis and VX axis are closer to each other.

That is, in an example shown in FIG. 10, the weighting part 324*b* increases the weight of the particle data set derived from the vectors PV1 and PV2, and reduces the weight of the particle data set derived from the vector PV3. As a result, it is possible to improve a resampling accuracy in the subsequent resampling part 325*b* and to improve an accuracy of the calculated target data set.

Next, the resampling part 325*b* rearranges (resamples) the particle data set based on the weight of each of the current particle data sets. Specifically, the resampling part 325*b* moves the particle data set having a small weight to the instantaneous data set 100.

The target data generator 326*b* recalculates the probability density function based on the current particle data sets rearranged by the resampling part 325*b* and generates the target data set based on a center of gravity of the recalculated probability density function. The target data generator 326*b* generates the target data set based on the center of gravity of the recalculated probability density function, but may generate the target data set, for example, based on an average of the probability density function.

The target data generator 326*b* treats the instantaneous data set 100 to which the particle data set has not been assigned as the new target, and outputs the instantaneous data set 100 as the target data set directly. That is, in the case of the new target, the target data generator 326*b* outputs the instantaneous data set 100 as the target data set.

Figure 11:
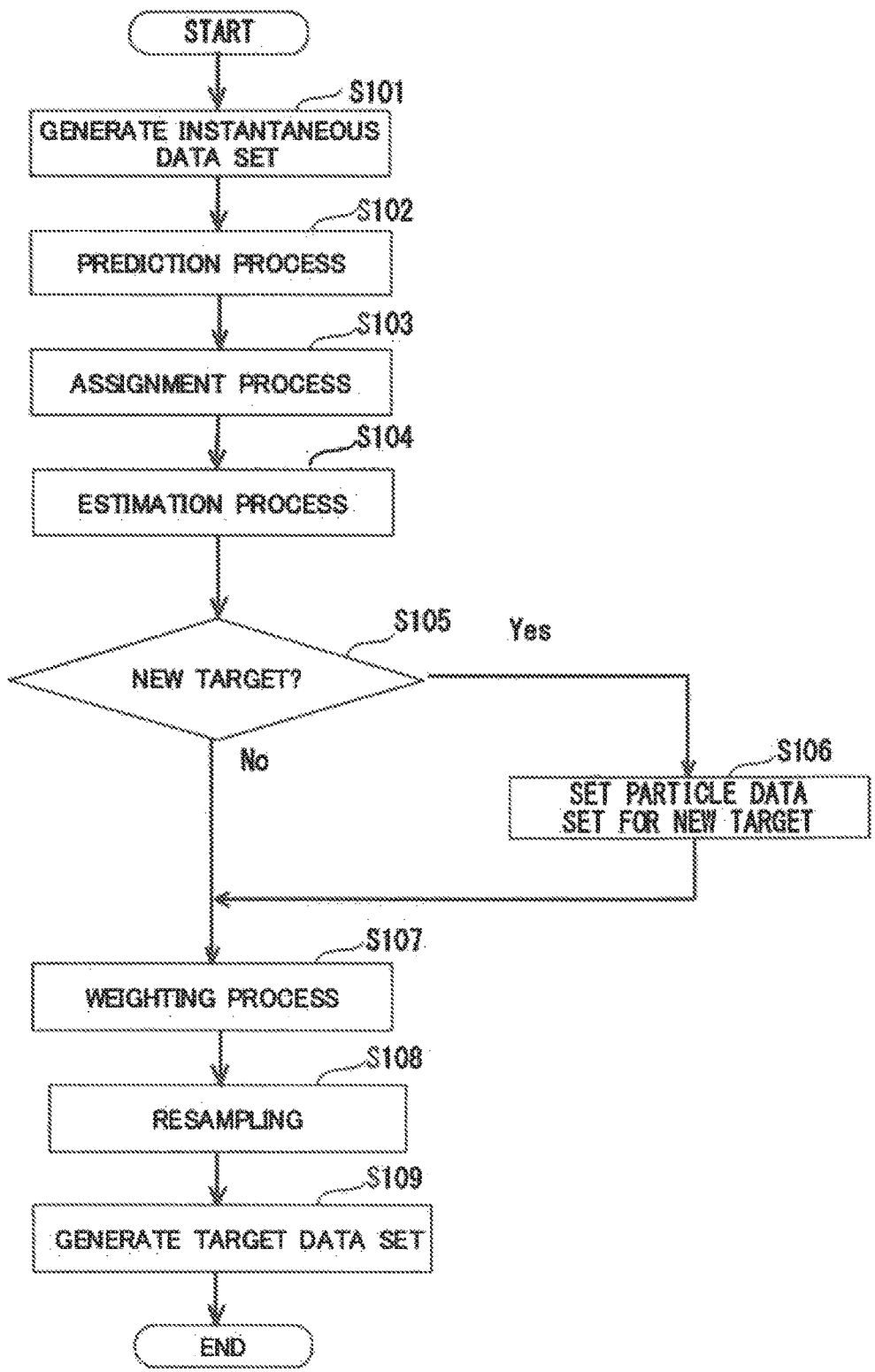
FIG. 11 is a flowchart illustrating a procedure of a process executed by a target detection apparatus according to the embodiment.

Next, with reference to FIG. 11, a procedure of a process executed by the processing apparatus 30 according to the embodiment will be described. FIG. 11 is a flowchart illustrating the procedure of the process executed by the processing apparatus 30 according to the embodiment.

As illustrated in FIG. 11, the generator 32*a* first generates the instantaneous data set 100 including the relative velocity of the target with respect to the host vehicle MC for each of the plurality of the reflection points at which the transmitted radio waves are reflected by the target (a step S101).

Subsequently, the prediction part 321*b* of the filter processor 32*b* performs a prediction process for predicting the current particle data set based on the previous particle data set (a step S102). When there is no previous particle data set, the filter processor 32*b* predicts the current particle data set based on the relative velocity of the previous instantaneous data set 100.

Subsequently, the assignment part 322*b* assigns the current instantaneous data set 100 to the current particle data set (a step S103). Subsequently, the estimator 323*b* estimates the motion vector V of the target based on a plurality of the current instantaneous data sets 100 (a step S104). A procedure of the estimation process by the estimator 323*b* will be described in FIG. 12 later.

Subsequently, the assignment part 322*b* determines a presence or absence of the new target by a presence or absence of the instantaneous data set 100 to which the current particle data set has not been assigned (a step S105). When the instantaneous data set 100 is the new target (Yes in the step S105), the assignment part 322*b* sets a predetermined particle data set (e.g., a particle data set in an initial state) for the instantaneous data set 100 corresponding to the new target (a step S106).

Subsequently, when the instantaneous data set 100 is not the new target (No in the step S105), the weighting part 324b weighs each of the current particle data sets based on the motion vector V estimated by the estimator 323b (a step S107).

Subsequently, the resampling part 325b performs a resampling of the current particle data sets based on weighting by the weighting part 324b (a step S108). Subsequently, the target data generator 326b updates the probability density function of the resampled current particle data sets, generates the target data set based on the probability density function (a step S109) and ends the process.

Figure 12:
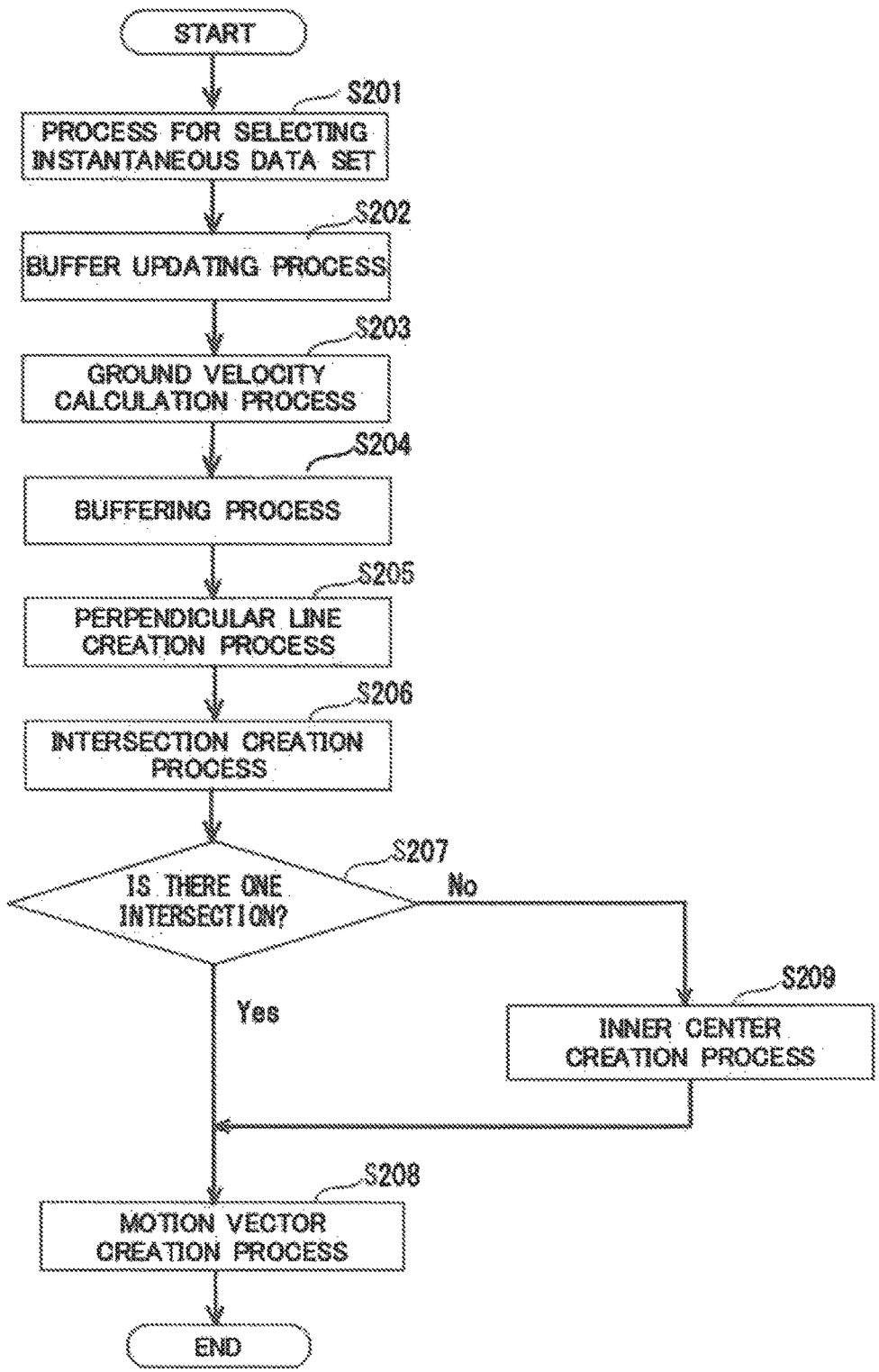
FIG. 12 is a flowchart illustrating a procedure of an estimation process executed by the estimator according to the embodiment.

Next, with reference to FIG. 12, the procedure of the estimation process executed by the estimator 323b according to the embodiment will be described. FIG. 12 is a flowchart illustrating the procedure of the estimation process executed by the estimator 323b according to the embodiment.

As illustrated in FIG. 12, the instantaneous data selector 323ba first performs a selection process for selecting the instantaneous data set 100 that is used for the estimation process of the motion vector V among the plurality of the instantaneous data sets (a step S201).

Subsequently, by correcting the angle corresponding to the direction to the host vehicle MC in the past instantaneous data set 100 stored in the history data set 33a of the memory 33 based on the change amount of the rotation angle of the host vehicle MC, the buffer updating part 323bb performs the updating process of the history data set 33a (a step S202).

Subsequently, the ground velocity calculator 323bc calculates the ground velocity obtained by removing the velocity component of the host vehicle MC from the relative velocities of the reflection points with respect to the host vehicle MC included in the instantaneous data set 100 (a step S203). Subsequently, the buffering part 323bd performs a buffering process for storing the new instantaneous data set 100 selected by the instantaneous data selector 323ba as the history data set 33a (a step S204).

Subsequently, based on the ground velocities with respect to the host vehicle MC included in the instantaneous data sets 100 calculated by the ground velocity calculator 323bc, the perpendicular line creation part 323be aligns the starting points of the projected ground velocities GV respectively corresponding to the plurality of the instantaneous data sets 100 to a predetermined point and performs the perpendicular line creation process for creating the perpendicular lines VL to the projected ground velocities GV (a step S205).

Subsequently, the intersection creation part 323bf performs an intersection creation process for creating the intersection CP of the perpendicular lines VL created by the perpendicular line creation part 323be (a step S206). The motion vector creation part 323bh determines whether or not there is one intersection CP created by the intersection creation part 323bf (a step S207).

When there is one intersection CP created by the intersection creation part 323bf (Yes in the step S207), the motion vector creation part 323bh performs a motion vector creation process (a step S208) and ends the process. In this case, the motion vector creation part 323bh creates a vector from the predetermined point to the intersection CP as the motion vector V.

On the other hand, in the step S207, when the intersection CP is not one intersection (No in the step S207), that is, when there are three or more intersections CP, the inner center creation part 323bg performs an inner center creation process (a step S209) for creating the inner center IP of the triangle that is formed by three intersections CP and moves the process to the step S208. In this case, in the step S208, the motion vector creation part 323bh performs the motion vector creation process based on the inner center IP created by the inner center creation part 323bg.

As described above, the processing apparatus 30 according to the embodiment includes the generator 32a, the ground velocity calculator 323bc and the estimator 323b. The generator 32a generates the instantaneous data set 100 including the relative velocity of the target with respect to the host vehicle MC for each of the plurality of the reflection points at which the transmitted radio waves are reflected by the target. The ground velocity calculator 323bc calculates the ground velocity based on the relative velocities of the reflection points with respect to the host vehicle MC included in the instantaneous data set 100 generated by the generator 32a and a velocity of the host vehicle MC. Based on the ground velocities calculated by the ground velocity calculator 323bc, the estimator 323b aligns the starting points of the projected ground velocities GV with respect to the host vehicle MC respectively corresponding to the plurality of the instantaneous data sets 100 and estimates the movement direction (one element of the motion vector V) of the target from the intersection CP of the perpendicular lines to the projected ground velocities GV. As a result, it is possible to improve the responsiveness to the target.

In the embodiment described above, the target detection apparatus 1 is mounted on the vehicle, but may be obviously mounted on a moving body other than the vehicle, for example, a ship or an airplane.

In the embodiment described Above, ESPRIT has been exemplified as the arrival direction estimation method that is used for the processing apparatus 30, but is not limited thereto. For example, DBF (Digital Beam Forming), PRISM (Propagator method based on an Improved Spatial-smoothing Matrix), MUSIC (Multiple Signal Classification), or the like, may be used.

The processing apparatus 30 according to the embodiment may verify an accuracy of the motion vector V created by the motion vector creation part 323bh based on the particle data set. Such a point will be described with reference to FIG. 13.

Figure 13:
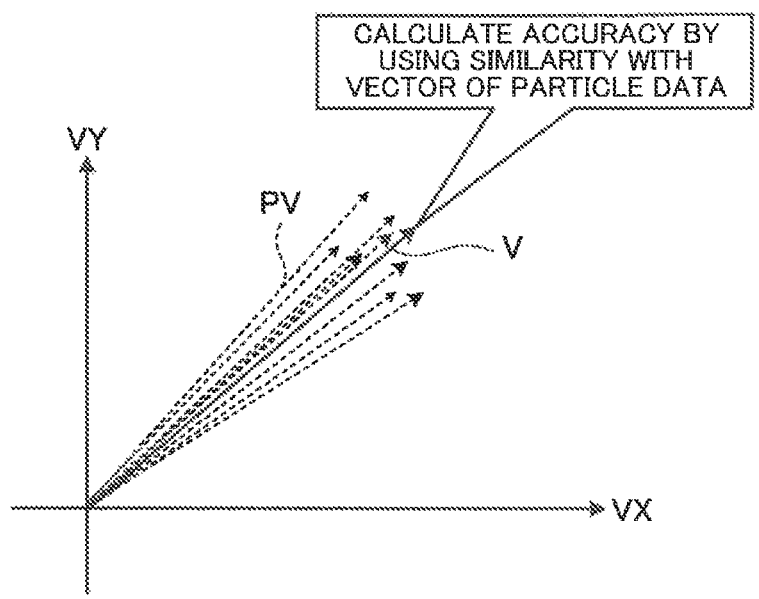
FIG. 13 illustrates a verification process of the motion vector.

FIG. 13 illustrates a verification process of the motion vector V. FIG. 13 illustrates the motion vector V and vectors PV based on the particle data set.

As illustrated in FIG. 13, the estimator 323b calculates the accuracy indicating reliability of the motion vector V by using the similarity between the created motion vector V and the vectors PV of the particle data set. Specifically, the estimator 323b calculates the similarity of the ground velocity components between the motion vector V and the vectors PV on the VY axis and VX axis as the accuracy.

For example, when the similarity between the vectors PV of the particle data set and the motion vector V is equal to or more than a predetermined value, the estimator 323b regards the motion vector V as a defined value of a final estimation result. On the other hand, when the similarity between the vectors PV of the particle data set and the motion vector V is less than the predetermined value, the estimator 323b prohibits use of the motion vector V. As a result, it is possible to use the motion vector V having higher estimation accuracy.

In FIG. 13, the similarity of the ground velocity components between the motion vector V and the vectors PV on the VY axis and the VX axis has been calculated as the accuracy, but for example, the similarity of the actual movement directions between the motion vector V and the vectors PV on the VY axis and the VX axis may be calculated as the accuracy.

In the embodiment described above, a case in which the filter processor 32b uses the particle filter has been described, but a time series filter that is used is not limited to the particle filter and may be, for example, the time series filter, such as a Kalman filter or an αβ filter.

Second Embodiment

A processing apparatus according to another embodiment will be hereinafter described in detail with reference to accompanying drawings. Description will be made on different points from the first embodiment, and the same description as the first embodiment will be omitted.

Figure 14A:
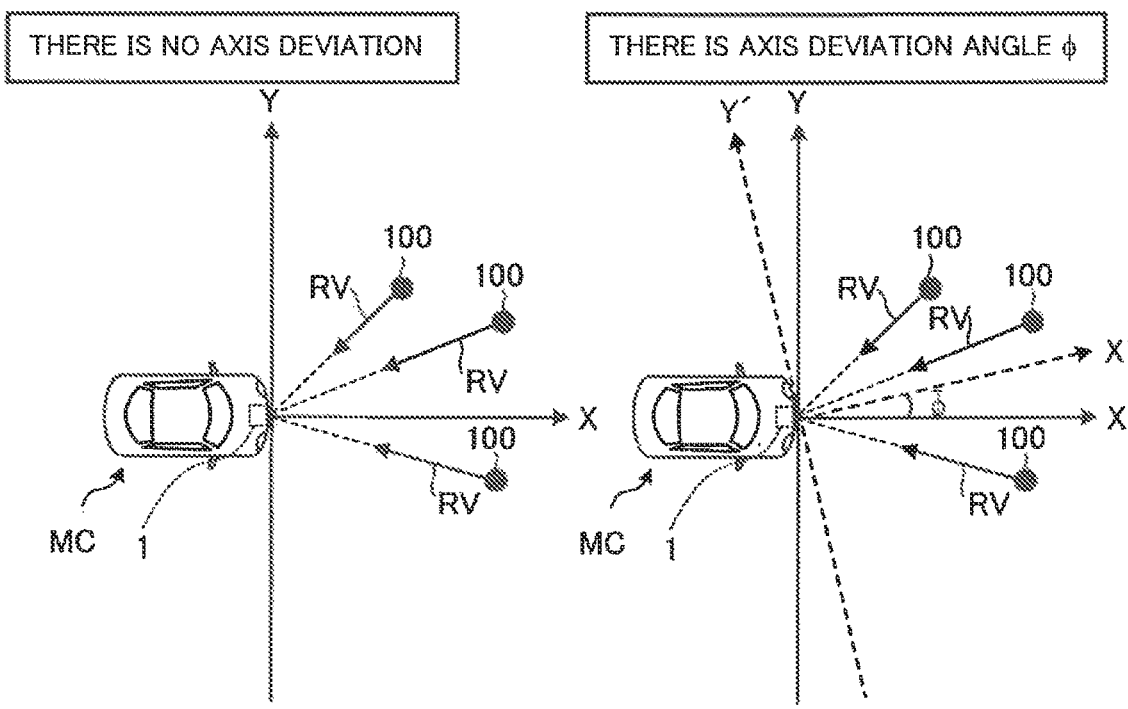
FIG. 14A illustrates a mounting example of a radar apparatus.

First, outlines of the processing apparatus and an axis deviation detection method according to the embodiment will be described with reference to FIG. 14A and FIG. 14B. FIG. 14A illustrates a mounting example of a target detection apparatus 1 including the processing apparatus according to the embodiment. FIG. 14B illustrates the outline of the axis deviation detection method according to the embodiment. FIG. 14A illustrates a host vehicle MC mounting the target detection apparatus 1 according to the embodiment.

In the following, a reflection point derived from a stationary object will be especially described for the outline description. Specifically, each of instantaneous data sets 100 shown in FIG. 1A is derived from the stationary object, for example, a road surface. Each of the instantaneous data sets 100 includes a projected relative velocity RV of the reflection point with respect to the host vehicle MC.

Meanwhile, in the conventional technology, there is a technology that detects an axis deviation of the target detection apparatus. The axis deviation means, for example, an installation direction deviation of the target detection apparatus. In the conventional technology, in order to detect the axis deviation of the target detection apparatus, it has been necessary to continuously detect a roadside object, such as a guardrail, and it has been necessary to process several scans to detect the axis deviation. Furthermore, it has been necessary to detect the axis deviation in a limited environment in which there are roadside objects around a host vehicle.

Therefore, in the axis deviation detection method according to the embodiment, the axis deviation can be detected with one scan and the axis deviation can be detected in the environment in which there is no roadside object.

Specifically, the processing apparatus according to the embodiment calculates a relative velocity (a relative-motion vector Vr) of the stationary object and estimates a movement direction of the host vehicle MC based on the projected relative velocities of the reflection points with respect to the host vehicle in a plurality of the instantaneous data sets 100. Then, the processing apparatus according to the embodiment compares the movement direction of the host vehicle MC that is estimated based on the relative-motion vector Vr and an actual movement direction of the host vehicle MC so as to detect an axis deviation of the target detection apparatus 1.

Here, in this embodiment, the relative velocity is used instead of the ground velocity used in the first embodiment. The ground velocity can be used also in this embodiment, but it is preferable to use the relative velocity in terms of a calculation accuracy of the relative-motion vector Vr.

FIG. 14B illustrates a two dimensional plane in which starting points of three projected relative velocities RV corresponding to three instantaneous data sets 100 are aligned to an origin. The processing apparatus according to embodiment, based on the projected relative velocities RV, aligns the starting points of the projected relative velocities RV to the origin, draws perpendicular lines passing through respective endpoints of the projected relative velocities RV, and calculates an intersection of the perpendicular lines. The processing apparatus according to embodiment calculates the relative-motion vector Vr having a starting point which is the starting points of the projected relative velocities RV, i.e., an origin of a two dimensional coordinate and having an end point which is an intersection CP.

At this time, the relative-motion vector Vr is equivalent to the relative velocity of the stationary object. If the relative-motion vector Vr is added to a ground velocity (self-motion vector) of the host vehicle MC, it becomes 0. That is, when there is no axis deviation, the relative-motion vector Vr and the self-motion vector are in opposite directions to each other.

On the other hand, each of FIG. 14A and FIG. 14B illustrates an axis deviation angle φ for a case in which there is the axis deviation. When there is the axis deviation, coordinate axes that are recognized by the target detection apparatus 1 are an X'-Y' axis shown in FIG. 14A and a VX'-VY' axis shown in FIG. 14B. For example, in the axis deviation angle φ, it is assumed that the target detection apparatus 1 is deviated leftward with respect to the traveling direction of the host vehicle. At this time, it is assumed that there are two reflection points on a left side and one reflection point on a right side. However, due to the axis deviation, the target detection apparatus 1 recognizes the reflection points in a state in which positions of all reflection points are deviated. In this example, the target detection apparatus 1 recognizes one reflection point on the left side, one reflection point in front and one reflection point on the right side in a state in which the positions of all reflection points are deviated rightward by the angle φ. Thus, the intersection CP does not appear on a VX' axis as shown in FIG. 14B. Therefore, the relative-motion vector Vr that is generated by connecting the origin and the intersection CP and the self-motion vector are not in opposite directions to each other. The deviation angle between the VX' axis and the relative-motion vector Vr at this time is φ and the relative-motion vector Vr and the self-motion vector are deviated according to the axis deviation angle.

That is, the processing apparatus and the axis deviation detection method according to the embodiment estimate the movement direction of the host vehicle MC based on the intersection CP and detect the axis deviation of the target detection apparatus based on the movement direction and the actual movement direction of the host vehicle MC.

The processing apparatus and the axis deviation detection method according to the embodiment can calculate the intersection CP with one scan process. As a result, the target detection apparatus can detect the axis deviation rapidly.

The processing apparatus and the axis deviation detection method according to the embodiment can calculate the intersection CP based on the road surface as described above. That is, in order to detect the axis deviation, the processing apparatus according to embodiment does not need a roadside object, such as a guardrail. As a result, it is possible to remove conventional environmental constraints and it is possible to detect the axis deviation in various environments.

Figure 15:
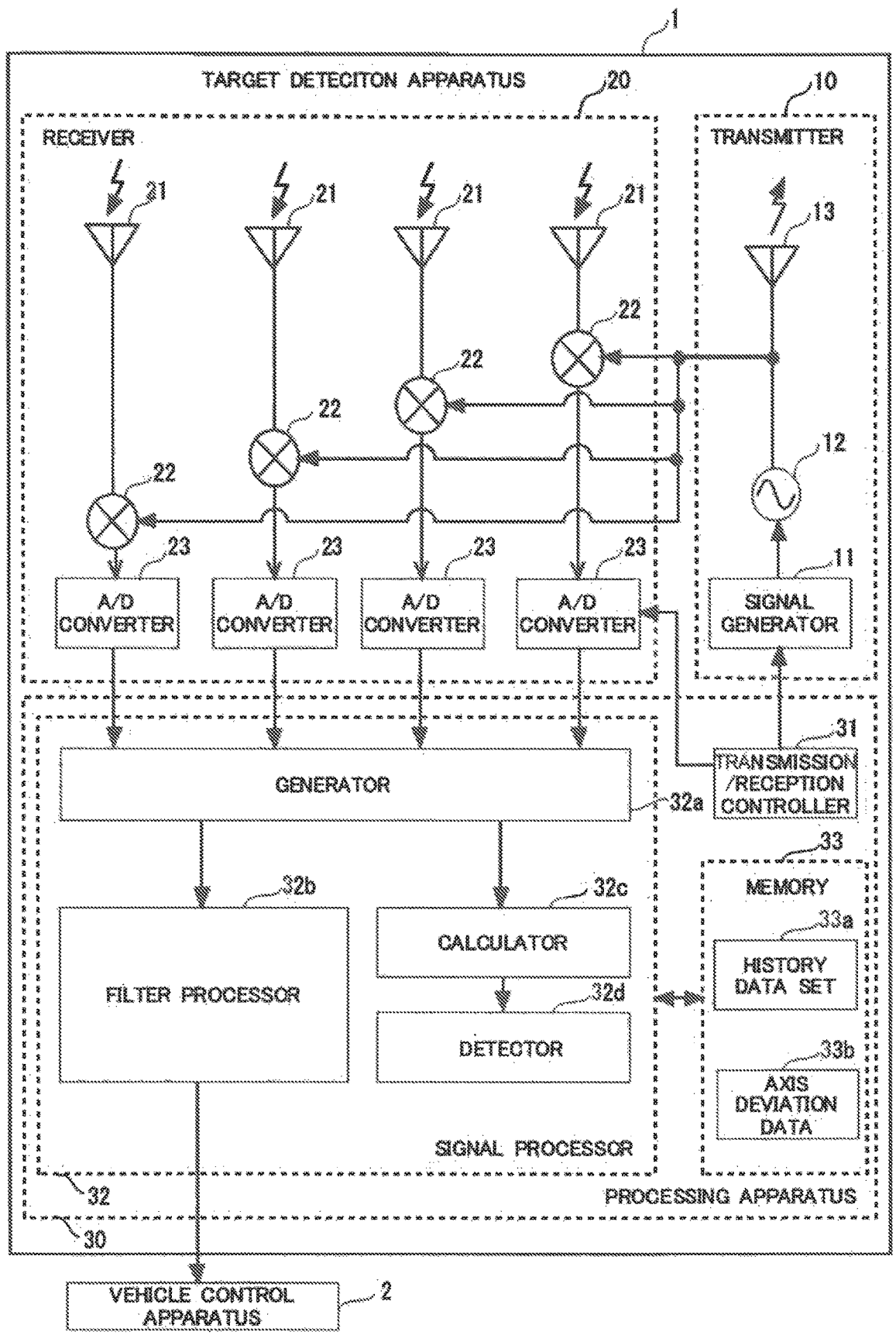
FIG. 15 is a block diagram of the radar apparatus.

Next, a configuration of a processing apparatus 30 according to the embodiment will be described in detail with reference to FIG. 15. FIG. 15 is a block diagram illustrating a configuration of the target detection apparatus 1 that includes the processing apparatus 30 according to the embodiment. In addition to the configuration of the first embodiment, a signal processor 32 included in the processing apparatus 30 has a calculator 32c and a detector 32d. A memory 33 includes axis deviation data 33b in addition to the configuration of the first embodiment.

In the same manner as the estimator in the first embodiment, based on the projected relative velocities RV included in the plurality of the instantaneous data sets 100 generated by a generator 32a, the calculator 32c aligns the starting points of the relative velocities (projected relative velocities RV) of the reflection points with respect to the host vehicle respectively corresponding to the plurality of the instantaneous data sets 100, calculates the intersection CP of the perpendicular lines VL to the projected relative velocities RV and calculates the relative-motion vector Vr.

Figure 16:
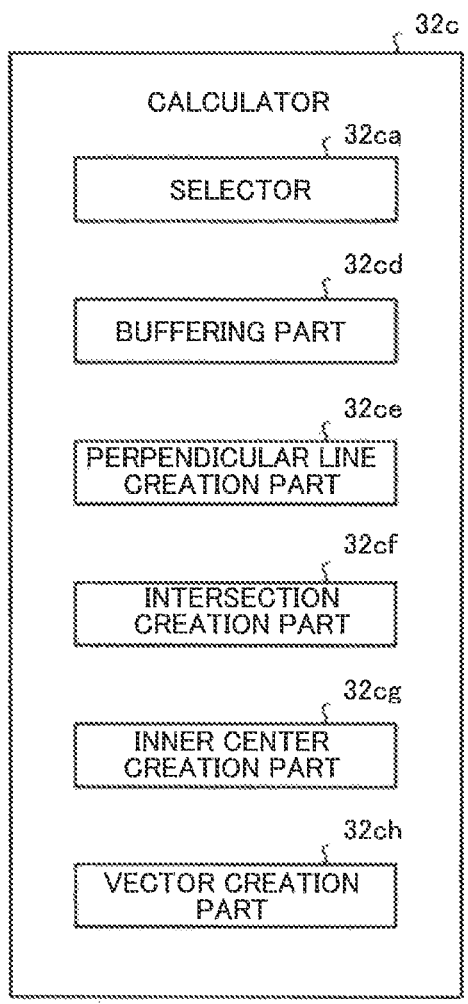
FIG. 16 is a block diagram of a calculator.

FIG. 16 is a block diagram of the calculator 32c. As illustrated in FIG. 16, the calculator 32c includes a selector 32ca, a buffering part 32cd, a perpendicular line creation part 32ce, an intersection creation part 32cf, an inner center creation part 32cg and a vector creation part 32ch. The main configuration and operation are the same as those of the estimator in the first embodiment. However, a different point of this embodiment from the first embodiment is that the calculator 32c does not have to include a buffer updating part and a ground velocity calculator. In the operation of the calculator it is different from the first embodiment in that the relative velocity is used instead of the ground velocity. The operations of the selector and the buffering part are different from corresponding functional block operations in the estimator. Such a difference will be hereinafter described in detail.

The selector 32ca selects, for example, the instantaneous data set 100 corresponding to the stationary object from among the instantaneous data sets 100 and stores the instantaneous data set 100 in the buffering part 32cd. The stationary objects here include not only a road surface but also all of the stationary objects, such as a wall, a guardrail and a stationary vehicle, which are capable of being detected by the target detection apparatus 1.

The selector 32ca selects the instantaneous data set 100 that becomes an "absolute value of the relative velocity RV—the host vehicle speed cos (horizontal angle)≈0" among the instantaneous data sets 100 as the instantaneous data set 100 corresponding to the stationary object. That is, when the absolute value of the relative velocity RV of the actually detected reflection point is close to an absolute value of the ground velocity of the host vehicle with respect to the reflection point calculated based on the host vehicle speed, the selector 32ca determines that the instantaneous data set 100 is the instantaneous data set 100 corresponding to the stationary object, and selects the instantaneous data set 100. This is because the absolute value of the ground velocity of the host vehicle with respect to the reflection point is ideally equivalent to the absolute value of the relative velocity of the reflection point (stationary object) with respect to the host vehicle. The host vehicle speed means an actual traveling velocity of the host vehicle MC and the horizontal angle indicates a direction of the reflection point in the instantaneous data set 100 with respect to the host vehicle MC.

That is, even when the instantaneous data sets 100 are acquired from a plurality of the stationary objects, the target detection apparatus 1 according to the embodiment treats the instantaneous data sets 100 as the instantaneous data set 100 acquired from one stationary object. As a result, even when a sufficient amount of the instantaneous data set 100 cannot be acquired from one stationary object, it is possible to detect the axis deviation using the instantaneous data sets of the plurality of the stationary objects.

That is, the processing apparatus 30 according to the embodiment can detect the axis deviation in various environments by detecting the axis deviation using the instantaneous data sets 100 of the plurality of the stationary objects.

At this time, for example, the selector 32ca may exclude the instantaneous data set 100 generated by the reflection point located at a high position from the instantaneous data sets 100 corresponding to the stationary objects, and store the remaining instantaneous data sets 100 in the buffering part 32cd. The projected relative velocity RV of the reflection point located at the high position has a larger velocity component in a height direction than the projected relative velocity RV of the reflection point located at a low position. In this embodiment, a plane approximation in which a height of the reflection point is not considered is performed. In this case, a large velocity component in the height direction becomes a factor for an error.

In this case, for example, the selector 32ca excludes the instantaneous data set 100 having a power angle that is equal to or lower than a predetermined value as the instantaneous data set 100, generated by the reflection point located at the high position. In this embodiment, it is assumed that the target detection apparatus 1 is mainly installed in a horizontal direction. In this case, as the position becomes higher, that is, an elevation angle becomes larger, a strength of a transmitted radio wave decreases, so that the power angle obtained from the reflection point located at the high position decreases.

When the selector 32ca cannot select the instantaneous data set 100 corresponding to any stationary object in a predetermined period, the selector 32ca may perform a warning. In such a case, for example, it is assumed that a transmission axis is extremely deviated. For example, there are cases in which the transmission axis of the transmitted radio wave is directed in a vehicle width direction. In this case, when the host vehicle MC travels, the instantaneous data set 100 of the stationary object has a relative velocity greatly different from an ideal relative velocity that is calculated from the host vehicle speed and a direction of the reflection point, so that the instantaneous data set 100 is detected as the instantaneous data set 100 of a moving object.

In this case, the selector 32ca performs the warning and varies parameters corresponding to the axis deviation angles ϕ. When the instantaneous data set 100 corresponding to the stationary object is detected, the instantaneous data set 100 may be subjected to a subsequent process.

As a result, even when the transmission axis is extremely deviated, it is possible to detect the axis deviation.

The buffering part 32cd buffers the instantaneous data sets 100 selected by the selector 32ca. That is, by buffering the instantaneous data sets 100, it is possible to calculate the relative-motion vector V using the instantaneous data sets 100 of a plurality of scans. As a result, even when the amount of the instantaneous data set 100 is insufficient, it is possible to prevent an estimation accuracy of the relative-motion vector Vr from lowering.

The perpendicular line creation part 32ce creates the perpendicular lines VL to each of the projected relative velocities RV that indicate the relative velocities of the reflection points with respect to the host vehicle MC in the instantaneous data sets 100 selected by the selector 32ca. Detailed operations of the perpendicular line creation part 32ce are the same as those of the perpendicular line creation part 323*be* (refer to FIG. 6) in the first embodiment except that the projected relative velocity is used instead of the projected ground velocity.

The intersection creation part 32*cf* creates the intersection CP of the perpendicular lines VL created by the perpendicular line creation part 32*ce*. Detailed operations of the intersection creation part 32*cf* are the same as those of the intersection creation part 323*bf* (refer to FIG. 6) in the first embodiment.

When there are three or more intersections CP created by the intersection creation part 32*cf*, the inner center creation part 32*cg* creates an inner center IP (refer to FIG. 9A) of a triangle that is formed by the three intersections CP. Detailed operations of the inner center creation part 32*cg* are the same as those of the inner center creation part 323*bg* (refer to FIG. 6) in the first embodiment.

The vector creation part 32*ch* creates the relative-motion vector Vr of a target based on the intersection CP created by the intersection creation part 32*cf*. Detailed operations of the vector creation part 32*ch* are the same as those of the motion vector creation part 323*bh* (refer to FIG. 6) in the first embodiment. The vector creation part 32*ch* creates the relative-motion vector Vr as the motion vector V in the first embodiment.

Referring back to FIG. 15, the detector 32*d* will be described. The detector 32*d* detects the axis deviation of the target detection apparatus 1 based on the relative-motion vector Vr calculated by the calculator 32*c* and the actual movement direction of the host vehicle MC.

The detector 32*d* first calculates the ground velocity of the host vehicle MC, that is, the self-motion vector MV that indicates an actual movement amount and movement direction based on the actual traveling velocity and a steering angle, etc. of the host vehicle MC.

Figure 17A:
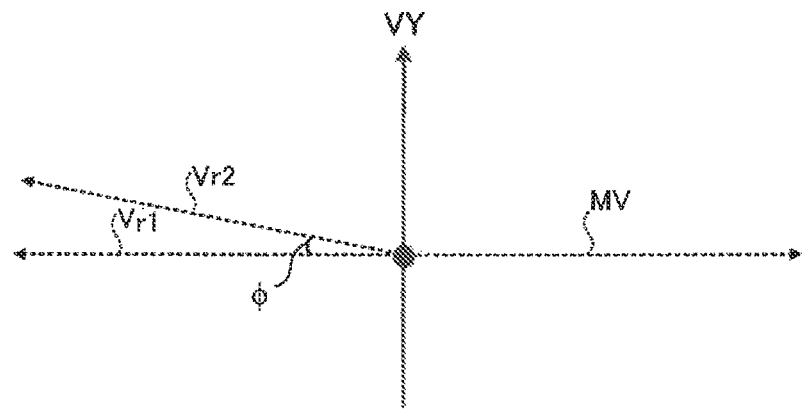
FIG. 17A illustrates a specific example of a process by a detector.

Subsequently, the detector 32*d* detects the axis deviation of the target detection apparatus 1 by comparing the relative-motion Vector Vr with the self-motion vector MV. FIG. 17A illustrates a specific example of a process by the detector 32*d*.

FIG. 17A illustrates two relative-motion vectors Vr1, Vr2 and the self-motion vector MV. When there is no axis deviation of the target detection apparatus 1, the relative-motion vector Vr and the self-motion vector MV are ideally in opposite directions to each other and magnitudes of the relative-motion vector Vr and the self-motion vector MV become equal.

That is, when the relative-motion vector Vr1 and the self-motion vector MV are in opposite directions to each other as shown in FIG. 17A and the magnitudes of the relative-motion vector Vr1 and the self-motion vector MV are equal, the target detection apparatus 1 can determine that there is no axis deviation.

On the other hand, like the relative-motion vector Vr2 shown in FIG. 17A, when the relative-motion vector Vr and the self-motion vector MV are not in opposite directions to each other, it can be determined that there is the axis deviation of the target detection apparatus 1. In this case, there is the axis deviation of the target detection apparatus 1 deviated by the axis deviation angle φ between the relative-motion vector Vr1 and the relative-motion vector Vr2.

When the detector 32*d* detects the axis deviation angle φ, the detector 32*d* stores the axis deviation angle φ in the memory 33 as the axis deviation data 33*b* shown in FIG. 15. As a result, a filter processor 32*b* described later generates a target data set after correcting angle parameters based on the axis deviation angle φ.

At this time, the detector 32*d* may reduce an influence of a noise included in the axis deviation angle φ by detecting the axis deviation angle φ after performing an annealing process. For example, the detector 32*d* first calculates a temporary axis deviation angle φ based on the relative-motion vector Vr calculated from an average value of a predetermined number (e.g., 100) of the intersections CP.

Thereafter, the detector 32*d* further smoothes the axis deviation angle φ using an exponential average as the following equation: the current axis deviation angle φ=the axis deviation angle φ up to the previous time×C+the temporary axis deviation angle φ (1−C). C is a predetermined coefficient that satisfies 0≤C≤1.

As described above, the detector 32*d* can reduce the influence of the noise included in the axis deviation angle φ by performing the annealing process without using the detected axis deviation angle φ as a detection result directly. The annealing process is not limited to the above example, and other filter processes may be performed.

Only when the traveling velocity of the host vehicle MC is equal to or more than a predetermined value, that is, a magnitude of the self-motion vector MV is equal to or more than a predetermined value, the detector 32*d* may perform a detection process of the axis deviation.

This is because when the magnitude of the self-motion vector MV is small, an error included in the self-motion vector MV is larger than when the magnitude of the self-motion vector MV is large. That is, when the traveling velocity of the host vehicle MC is equal to or more than a predetermined value, the detector 32*d* can detect the axis deviation with a high accuracy by performing axis deviation detection.

At this time, only when an acceleration of the host vehicle MC is 0, that is, the host vehicle MC is performing a uniform motion, the detector 32*d* may detect the axis deviation. As a result, it is possible to reduce an error of the self-motion vector MV associated with a change in the acceleration, and thus, it is possible to detect the axis deviation with a high accuracy.

Figure 17B:
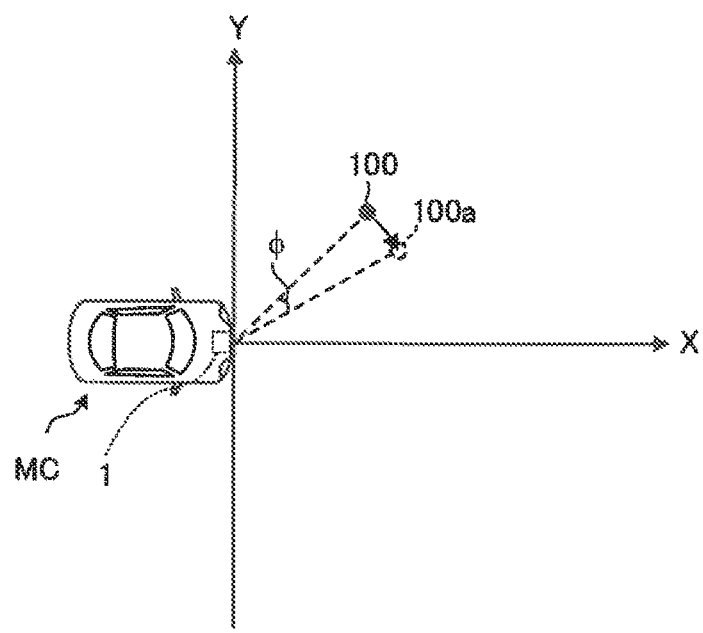
FIG. 17B illustrates a specific example of a correction process based on an axis deviation angle.

FIG. 17B illustrates a specific example of a correction process based on the axis deviation angle φ. As illustrated in FIG. 17B, when the axis deviation angle φ is detected by the detector 32*d*, the instantaneous data set 100 generated by the generator 32*a* is deviated from an actual position according to the axis deviation angle φ.

As a result, for example, by rotating the instantaneous data set 100 according to the axis deviation angle φ, it is possible to acquire the instantaneous data set 100 in which the axis deviation of the target detection apparatus 1 is corrected.

That is, when there is the axis deviation, the instantaneous data set 100 that should have been generated as an instantaneous data set 100*a* is actually generated in a state in which the instantaneous data set 100 is deviated from the instantaneous data set 100*a* by the axis deviation angle φ.

Therefore, by rotating the instantaneous data set 100 by the axis deviation angle φ, it is possible to acquire the real instantaneous data set 100*a*. In this way, by correcting the instantaneous data set 100 based on the axis deviation angle φ detected by the detector 32*d*, it is possible to acquire the accurate instantaneous data set 100.

Figure 18:
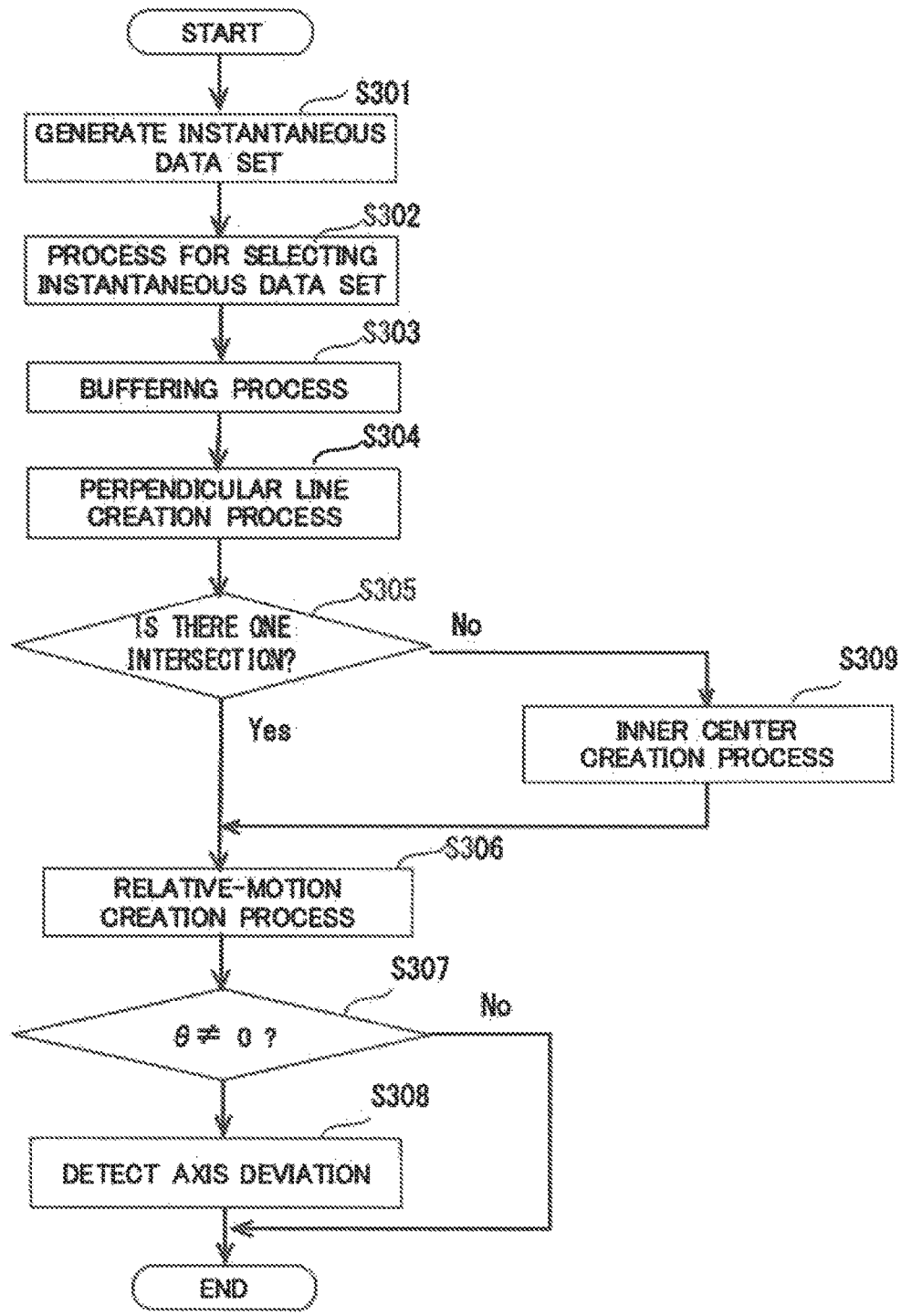
FIG. 18 is a flowchart illustrating a process procedure executed by the radar apparatus.

Subsequently, a process procedure executed by the processing apparatus 30 according to the embodiment will be described with reference to FIG. 18. FIG. 18 is a flowchart illustrating the process procedure executed by the processing apparatus 30. FIG. 18 illustrates a process flow in which the signal processor 32 included in the processing apparatus 30 detects the axis deviation.

As illustrated M FIG. 18, the signal processor 32 first generates the instantaneous data set 100 corresponding to the target based on a reflection wave of a transmission wave reflected by the object (a step S301). Subsequently, the signal processor 32 performs a selection process of the instantaneous data set 100 corresponding to the stationary object (a step S302).

Subsequently, the signal processor 32 performs a buffering process of the selected instantaneous data set 100 (a step S303) and performs a perpendicular line creation process based on the buffered instantaneous data set 100 (a step S304).

Subsequently, the signal processor 32 determines whether or not there is one intersection CP of the perpendicular lines VL (a step S305), and when there is one intersection CP (Yes in the step S305), the signal processor 32 performs a relative-motion creation process based on the intersection CP (a step S306).

On the other hand, when there is a plurality of the intersections CP, the signal processor 32 performs an inner center creation process (a step S309) and performs a relative-motion vector creation process based on the inner center IP (a step S306).

Thereafter the signal processor 32 determines whether or not the axis deviation angle $\phi \neq 0$ based on the relative-motion vector Vr and the self-motion vector MV (a step S307). When the axis deviation angle $\phi \neq 0$ (Yes in the step S307), the signal processor 32 detects the axis deviation of the transmission wave (a step S308), and ends the process.

When the axis deviation angle $\phi = 0$ (No in the step S307), the signal processor 32 does not detect that there is the axis deviation, and ends the process.

As described above, the target detection apparatus 1 according to the embodiment includes the generator 32a, the calculator 32c and the detector 32d. In the target detection apparatus 1 installed in a predetermined direction, the generator 32a generates the instantaneous data set 100 including the relative velocity (projected relative velocity RV) of the reflection point with respect to the host vehicle MC for each of a plurality of the reflection points at which the transmission waves are reflected by the target.

The calculator 32c aligns the starting points of the projected relative velocities RV respectively corresponding to the plurality of the instantaneous data sets 100 based on the projected relative velocities RV in the plurality of the instantaneous data sets 100 generated by the generator 32a, and calculates the intersection CP of the perpendicular lines VL.

The detector 32d detects the axis deviation of the target detection apparatus 1 with respect to a predetermined direction based on the intersection CP calculated by the calculator 32c and the actual movement direction of the host vehicle MC. Therefore, the processing apparatus 30 according to the embodiment can detect the axis deviation rapidly.

Meanwhile, in the embodiment described above, a case in which the instantaneous data set 100 corresponding to the stationary object is selected based on the instantaneous data set 100 and the intersection CP is calculated based on the instantaneous data set 100 has been described, but is not limited thereto.

That is, the instantaneous data set 100 that is used for calculating the intersection CP may be selected in combination with a high accuracy map. The high accuracy map means a map whose absolute position accuracy has three-dimensional space information of a centimeter class.

The processing apparatus 30 can grasp accurate positions of the roadside object, a building, and the like, by referring to the high accuracy map. As a result, the processing apparatus 30 can also refer to the high accuracy map and preferentially select the instantaneous data set 100 of the coordinate in which the roadside object, the building, and the like, exist, and calculate the intersection CP.

In this case, when the host vehicle MC is performing an autonomous driving, the processing apparatus 30 may detect the axis deviation. This is because a disturbance is less likely to occur in the autonomous driving than when a person drives.

In the embodiment described above, a case in which the axis deviation is detected based on the instantaneous data set 100 corresponding to the stationary object has been described, but is not limited thereto.

Figure 19:
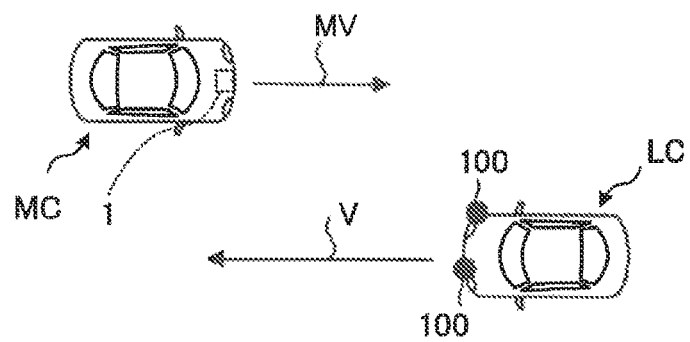
FIG. 19 illustrates a specific example of axis deviation detection based on another vehicle.

The axis deviation can be also detected based on the instantaneous data set 100 corresponding to another vehicle LC, such as a leading vehicle, an oncoming vehicle, or the like. FIG. 19 illustrates a specific example of the axis deviation detection based on another vehicle LC. In FIG. 19, a case in which another vehicle LC is an oncoming vehicle will be described, but another vehicle may be a leading vehicle. FIG. 19 illustrates a case in which the host vehicle MC and another vehicle LC are performing a uniform linear motion, respectively.

The processing apparatus 30 calculates the relative-motion vector Vr based on the instantaneous data set 100 based on another vehicle LC. After confirming that both the relative-motion vector Vr and the self-motion vector MV are in the uniform linear motion, the processing apparatus 30 may detect the axis deviation by comparing directions of both the relative-motion vector Vr and the self-motion vector MV.

In this case, the processing apparatus 30 may determine whether or not another vehicle LC is in the uniform linear motion, for example, by acquiring traveling information of another vehicle LC using vehicle-to-vehicle communication.

Furthermore, a radar apparatus has been described as an example of the target detection apparatus, but the invention is not limited thereto. The target detection apparatus that can use the processing apparatus 30 according to the present application may be, for example, a sonar using ultrasonic waves, and the like. It is possible to use any target detection apparatus that detects the relative velocity of the reflection point with respect to the target detection apparatus from the plurality of the reflection points by a Doppler effect, or the like.

While the invention has been shown and described in detail, the foregoing description is in all aspects illustrative and not restrictive. It is therefore understood that numerous other modifications and variations can be devised without departing from the scope of the invention.

What is claimed is:
1. A target detection apparatus, comprising:
a transmitter configured to output radio waves;
a receiver configured to receive the transmitted radio waves reflected by a target; and
a processing apparatus comprising a processor and associated memory configured to:
generate, for a plurality of reflection points at which the transmitted radio waves are reflected by the target, a plurality of instantaneous data sets, each of which includes a projected relative velocity of a said reflection point with respect to a host vehicle;

calculate, for each of the plurality of instantaneous data sets, a projected ground velocity of the reflection point with respect to the host vehicle based on the projected relative velocity and a velocity of the host vehicle;

align starting points of the calculated projected ground velocities to a predetermined point; and estimate a movement direction of the target from an intersection of perpendicular lines to the projected ground velocities whose starting points are aligned.

2. The target detection apparatus according to claim 1, wherein when there is one intersection, the processor estimates that a direction from the predetermined point to the one intersection is the movement direction of the target.

3. The target detection apparatus according to claim 1, wherein when there are three or more intersections, the processor estimates the movement direction based on an inner center of a triangle that is formed by the three or more intersections.

4. The target detection apparatus according to claim 1, wherein among the plurality of the instantaneous data sets, the processor does not use to estimate the movement direction of the target an instantaneous data set having a direction from the reflection point to the host vehicle similar to that of another one of the plurality of the instantaneous data sets.

5. The target detection apparatus according to claim 1, wherein:

each of the plurality of the instantaneous data sets includes a distance between the reflection point and the host vehicle, and among the plurality of the instantaneous data sets, the processor does not use to estimate the movement direction of the target an instantaneous data set having an absolute value of the relative velocity and the distance between the reflection point and the vehicle similar to those of another one of the plurality of the instantaneous data sets.

6. The target detection apparatus according to claim 1, wherein:

the memory stores the plurality of the instantaneous data sets generated by the processor as history data and the processor uses at least one past instantaneous data set stored as the history data for the estimation process of the movement direction when an amount of latest ones of the plurality of the instantaneous data sets is less than a predetermined amount.

7. The target detection apparatus according to claim 6, wherein the processor corrects a direction to the host vehicle in the at least one past instantaneous data set stored in the history data based on a change amount of the direction of the host vehicle.

8. The target detection apparatus according to claim 1, wherein:

the processor generates a target data set corresponding to each of the plurality of the instantaneous data sets by using a particle filter that assigns a plurality of particle data sets to the instantaneous data sets generated by the generator, wherein the processor regards the movement direction of the target as a defined value of an estimation result when a similarity between directions of vectors based on the plurality of the particle data sets and the movement direction is equal to or more than a predetermined value.

9. A target detection apparatus installed in a predetermined direction, comprising:

a transmitter configured to output radio waves;

a receiver configured to receive the transmitted radio waves reflected by a target; and a processing apparatus comprising a processor and associated memory configured to:

generate, for each of a plurality of reflection points at which the transmitted radio waves are reflected by the target, a plurality of instantaneous data sets, each of which includes a projected relative velocity of a said reflection point with respect to a host vehicle;

align starting points of the projected relative velocities to a predetermined point;

estimate a movement direction of the host vehicle from an intersection of perpendicular lines to the projected relative velocities whose starting points are aligned; and detect an axis deviation from the predetermined direction based on the estimated movement direction of the host vehicle.

10. The target detection apparatus according to claim 9, wherein when there is one intersection, the processor estimates that a direction from the predetermined point to the one intersection is the movement direction of the host vehicle.

11. The target detection apparatus according to claim 9, wherein among the plurality of the instantaneous data sets, the processor selects an instantaneous data set corresponding to a stationary object and creates the intersection based on the selected instantaneous data set.

12. The target detection apparatus according to claim 11, wherein the processor buffers the selected instantaneous data set and creates the intersection based on the buffered instantaneous data set.

13. The target detection apparatus according to claim 11, wherein when there are two or more intersections, the processor calculates a representative point representing a plurality of the intersections and estimates the movement direction of the host vehicle based on the representative point.

14. The target detection apparatus according to claim 13, wherein when there are three or more intersections, the processor creates an inner center of a triangle that is formed by the three or more intersections as the representative point.

15. The target detection apparatus according to claim 9, wherein the processor applies a temporal smoothing process to an axis deviation angle of the detected axis deviation.

16. An axis deviation detection method of a target detection apparatus installed in a predetermined direction, the target detection apparatus comprising:

a transmitter configured to output radio waves; and a receiver configured to receive the transmitted radio waves reflected by a target; and the method, which is executed by a processing apparatus comprising a processor and associated memory, comprising:
- (a) generating, for each of a plurality of reflection points at which the transmitted radio waves are reflected by the target, a plurality of instantaneous data sets, each of which includes a projected relative velocity of a said reflection point with respect to a host vehicle;
- (b) aligning starting points of the projected relative velocities to a predetermined point;
- (c) estimating a movement direction of the host vehicle from an intersection of perpendicular lines to the projected relative velocities whose starting points are aligned; and
- (d) detecting an axis deviation from the predetermined direction based on the estimated movement direction of the host vehicle.

\* \* \* \* \*